Jan. 24, 1961 J. P. ECKERT, JR., ET AL 2,969,478

INFORMATION STORAGE SYSTEM

Filed June 10, 1949 12 Sheets-Sheet 1

INVENTOR.
John Presper Eckert Jr.
Herman Lukoff
by George V. Eltgroth
Attorney

Jan. 24, 1961 J. P. ECKERT, JR., ET AL 2,969,478

INFORMATION STORAGE SYSTEM

Filed June 10, 1949 12 Sheets-Sheet 2

INVENTORS.
John Presper Eckert Jr.
Herman Lukoff
by [signature]
Attorney

Jan. 24, 1961 J. P. ECKERT, JR., ET AL 2,969,478

INFORMATION STORAGE SYSTEM

Filed June 10, 1949 12 Sheets-Sheet 3

INVENTORS
John Presper Eckert Jr.
Herman Lukoff
by George V. Eltgroth
Attorney

INVENTORS.
John Presper Eckert Jr.
Herman Lukoff
by George V. Eltgroth
Attorney

INVENTORS.
John Presper Eckert Jr.
Herman Lukoff
by George V. Eltgroth
Attorney

INVENTOR.
John Presper Eckert Jr.
BY Herman Lukoff
by George V. Eltgroth
Attorney INVENTORS.
John Presper Eckert Jr.
Herman Lukoff
by George V. Eltgroth
Attorney INVENTORS.
John Presper Eckert Jr.
Herman Lukoff
by George V. Eltgroth
Attorney Jan. 24, 1961 J. P. ECKERT, JR., ET AL 2,969,478

INFORMATION STORAGE SYSTEM

Filed June 10, 1949 12 Sheets-Sheet 9

INVENTORS.
John Presper Eckert Jr.
Herman Lukoff
by George V. Eltgroth
Attorney

Jan. 24, 1961 J. P. ECKERT, JR., ET AL 2,969,478

INFORMATION STORAGE SYSTEM

Filed June 10, 1949 12 Sheets-Sheet 10

INVENTORS.
John Presper Eckert Jr.
Herman Lukoff
by George V. Eltgroth
Attorney

INVENTORS.
John Presper Eckert Jr.
Herman Lukoff
by George V. Eltgroth
Attorney

Jan. 24, 1961 J. P. ECKERT, JR., ET AL 2,969,478

INFORMATION STORAGE SYSTEM

Filed June 10, 1949 12 Sheets-Sheet 12

INVENTORS.
John Presper Eckert Jr.
Herman Lukoff
by George V. Eltgroth
Attorney

United States Patent Office 2,969,478 Patented Jan. 24, 1961

2,969,478

INFORMATION STORAGE SYSTEM

John Presper Eckert, Jr., and Herman Lukoff, Philadelphia, Pa., assignors, by mesne assignments, to Sperry Rand Corporation, a corporation of Delaware Filed June 10, 1949, Ser. No. 98,178

19 Claims. (Cl. 315—12)

This invention relates to devices for the electrical storage of information, and more particularly to a system of such a nature making use of secondary emission phenomena.

Realization of the potentialities of large scale, high speed digital computers require economical and readily accessible storage systems for large quantities of digital information. The earliest electronic computers utilized banks of tubes arranged in ring-counter or flip-flop arrangement for the storage of such data. Inasmuch as storage of each unit of information in decade ring counters required a minimum of ten stages to remember one digit, such storage was relatively wasteful of equipment characterized by excessive power requirements. With storage in the binary form utilizing a single stage per digit of stored information, efficiency from an engineering viewpoint, weighing both economics and accessibility was considerably enhanced. Even so, at least one tube per stored digit was still required, without reference to the auxiliary equipment for reading into and out of such a memory or storage system. The recirculating acoustic memory described in the application of John Presper Eckert, Jr. and John W. Mauchly, Serial No. 783,328, now U.S. Patent 2,629,827, was the next stage in the development of more efficient methods for storing digital information. These devices, which involve recirculation, reshaping and retiming of impulse patterns traversing an acoustic delay path in the recirculation loop, were capable of storing up to a thousand digits while utilizing only from ten to fiteen tubes, depending upon the circuit refinements. It is immediately apparent that this represented a considerable advance from an economic standpoint. As is so often the case with engineering achievements, however, this was attained with some sacrifice in the ready accessibility of the stored information.

In the recirculating delay line type of memory, information once introduced into the delay line becomes inaccessible for a period equal to the delay time of the storage line so that, on the average, the access time will be of the order of one-half the delay time. This is indeed a serious consideration and one materially influencing the speed of any computer design including such a storage system. A typical delay time may be, for example, 350 microseconds, whence the average access time will be 175 microseconds. Since each step in the arithmetic operation may require only 20 microseconds, with 175 microseconds spent in standby condition waiting for the information to arrive at the processing point, such delay line memories have seriously limited computer operating speeds.

Accordingly, it is a primary object of the present invention to provide an improved system for the storage of digital information preserving the advantages of ready access.

Another object of the invention is to provide a new and improved information storage system utilizing secondary emission phenomena.

Yet another object of the invention is to provide a new and improved storage system more efficiently utilizing the electron tubes associated therewith.

Still another object of the invention is to provide a new and improved electric storage system using presently commercially available elements as components thereof.

A further object of the invention is to provide a new and novel electric storage system which is relatively insensitive to changes in attitude and mechanical shock.

Yet another object of the invention is to provide a new and improved beam positioning system.

Still another object of the invention is to provide new and improved apparatus simultaneously delivering divided down impulses on a number of leads.

A further object of the invention is to provide a secondary emission activated storage system which is relatively insensitive to changes in the secondary emissivity characteristic of immediately adjacent elements in the storage area.

Still a further object of the invention is to provide a new and novel electric storage system characterized by an improved signal to noise ratio in the output thereof.

Still a further object of the invention is to provide a new and improved method for varying the effective cross-section of a beam of charged particles.

Other objects and advantages of the invention will in part be obvious and in part be described when the following specification is read in conjunction with the drawings, in which.

Figure 1:
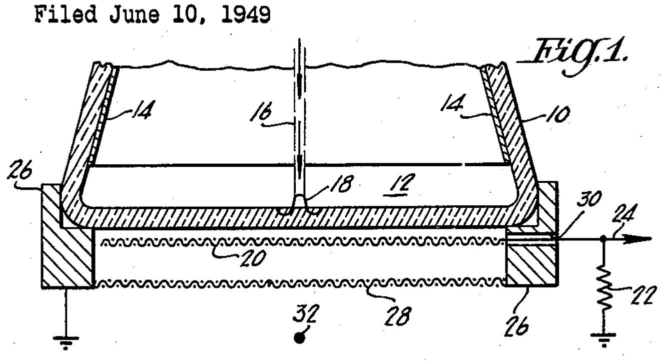
Figure 1 illustrates the charge distribution observed at the front wall of a cathode ray tube under the impact of a beam of sharply focused impinging electrons.
Figure 2:
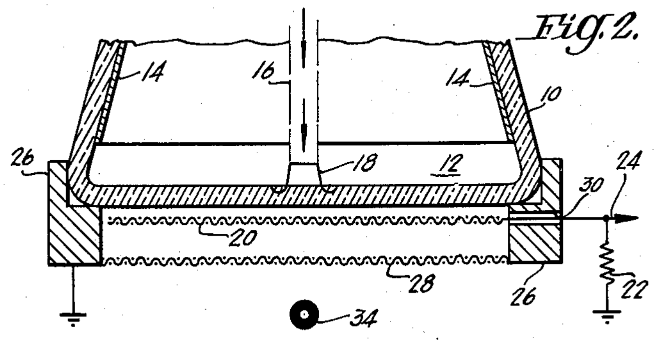
Figure 2 illustrates the charge configurations at the front wall of a high vacuum cathode ray tube observed under the impact of an unfocused electron beam of relatively large cross-sections.
Figure 2A:
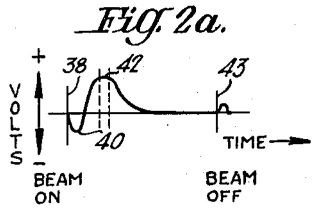
Figure 3:
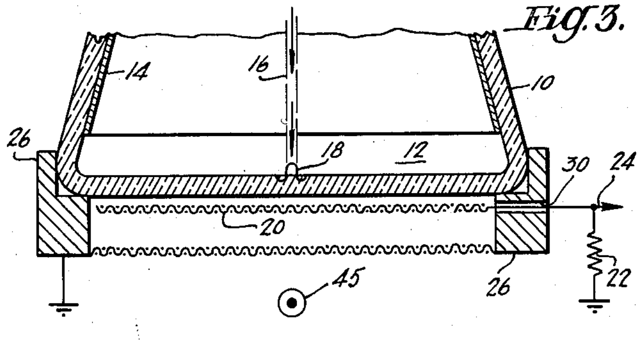
Figure 3A:
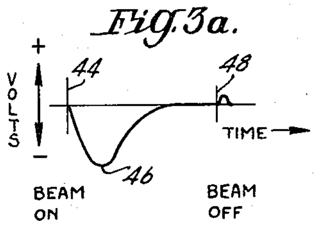
Figure 4:
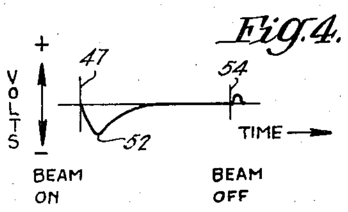
Figure 5:
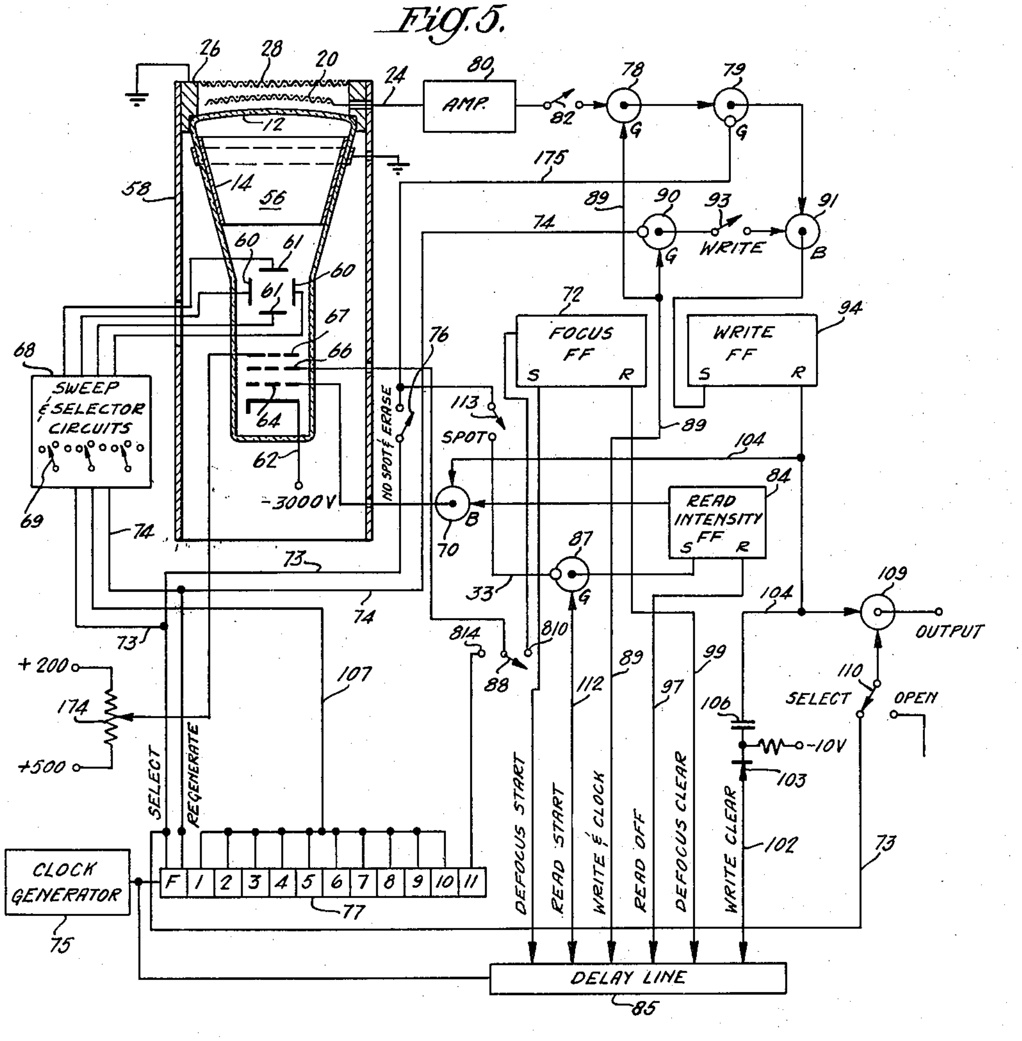
Figure 5A:
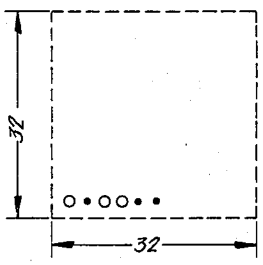
Figure 6:
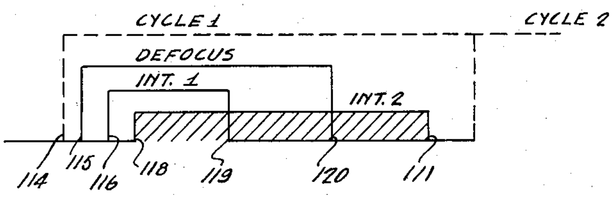
Figure 7:
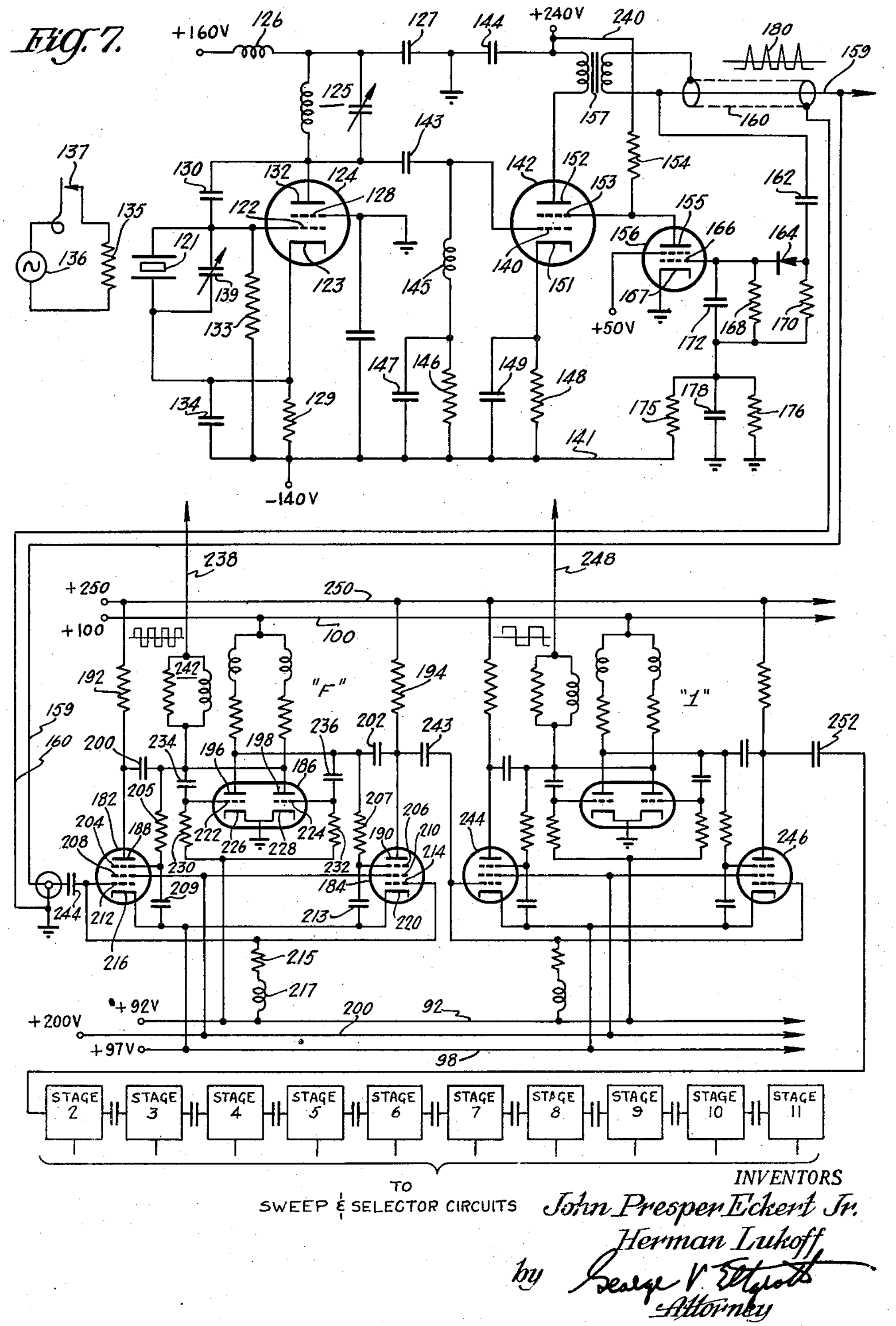
Figure 8:
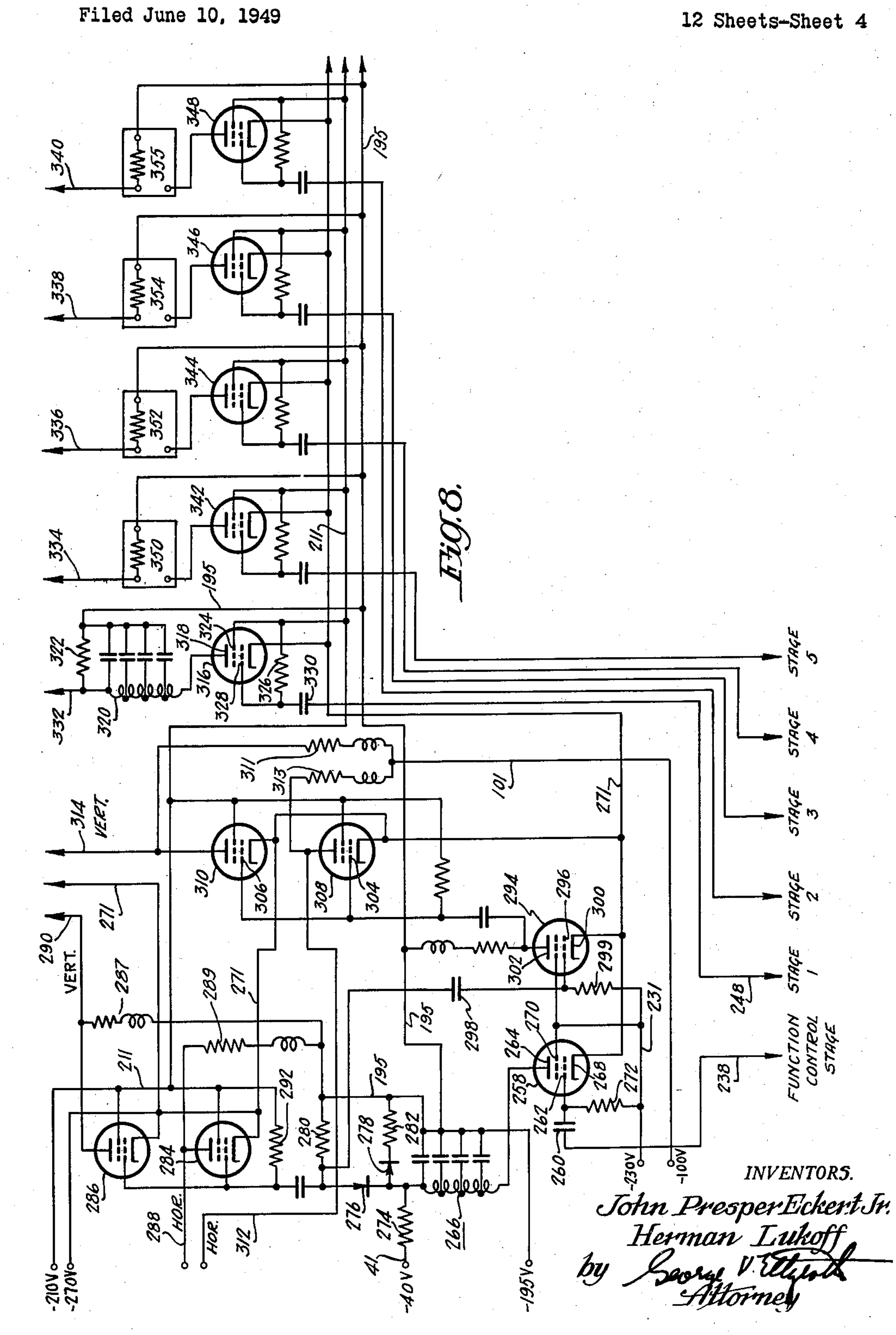
Figure 9:
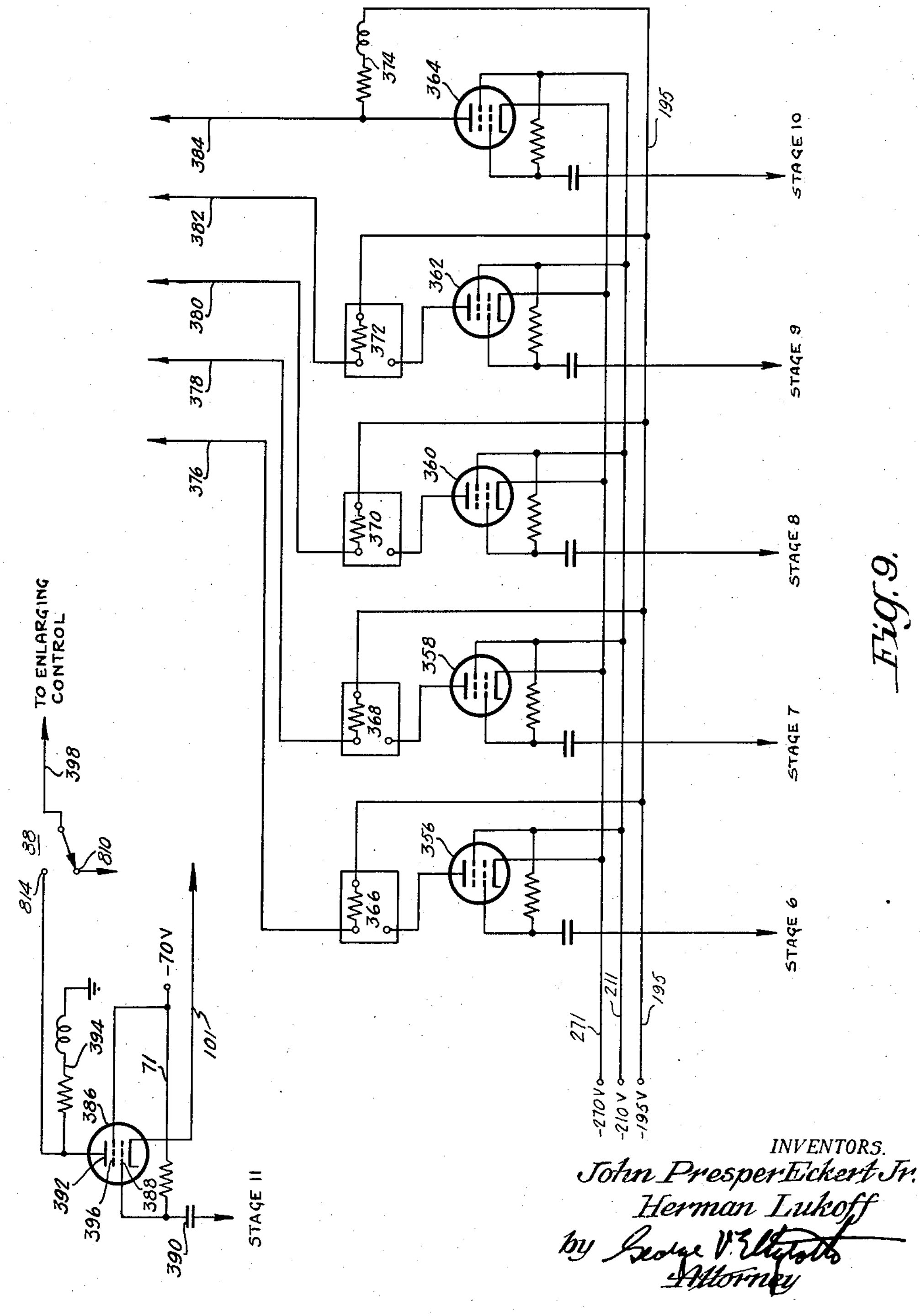
Figure 10:
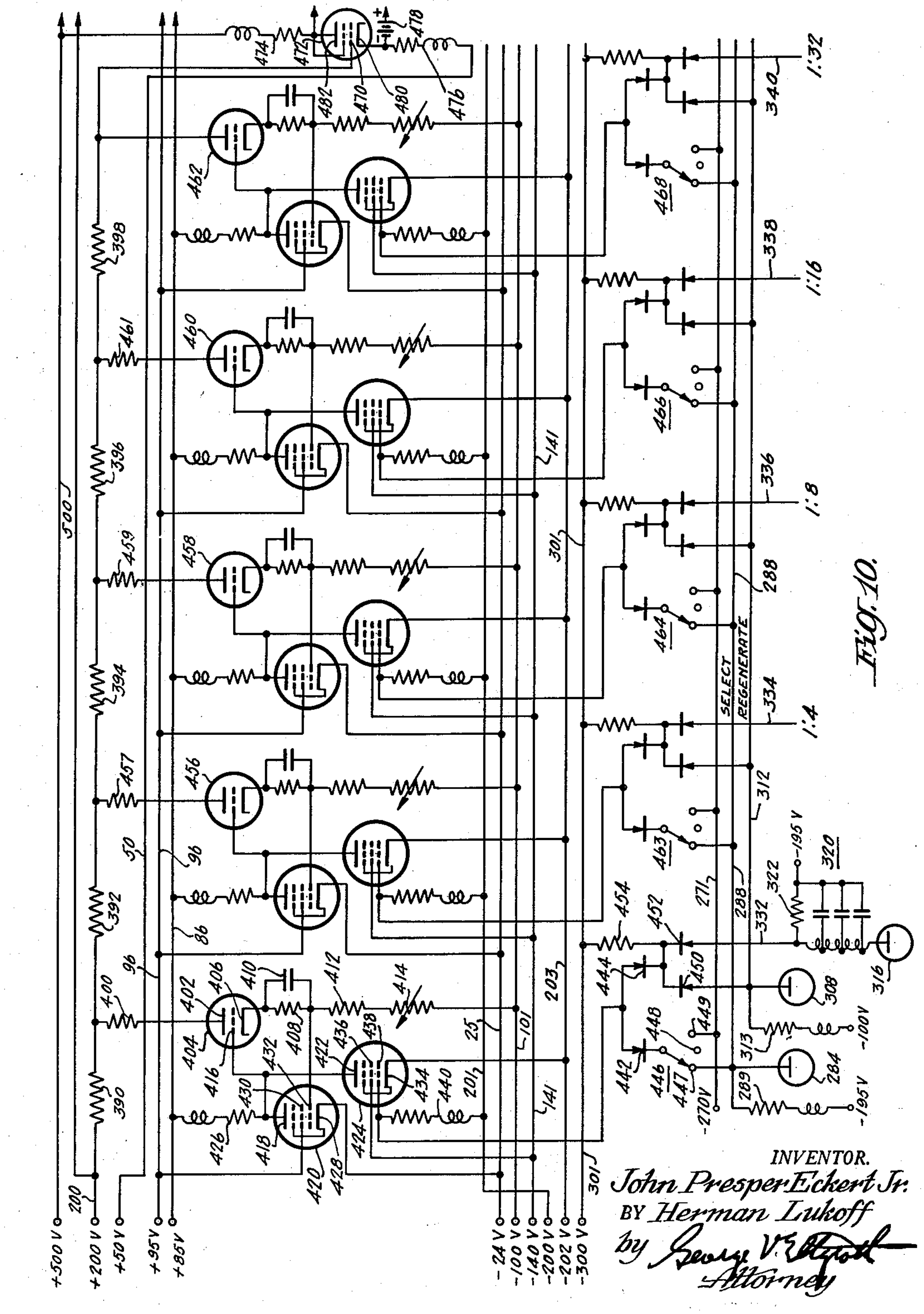
Figure 11:
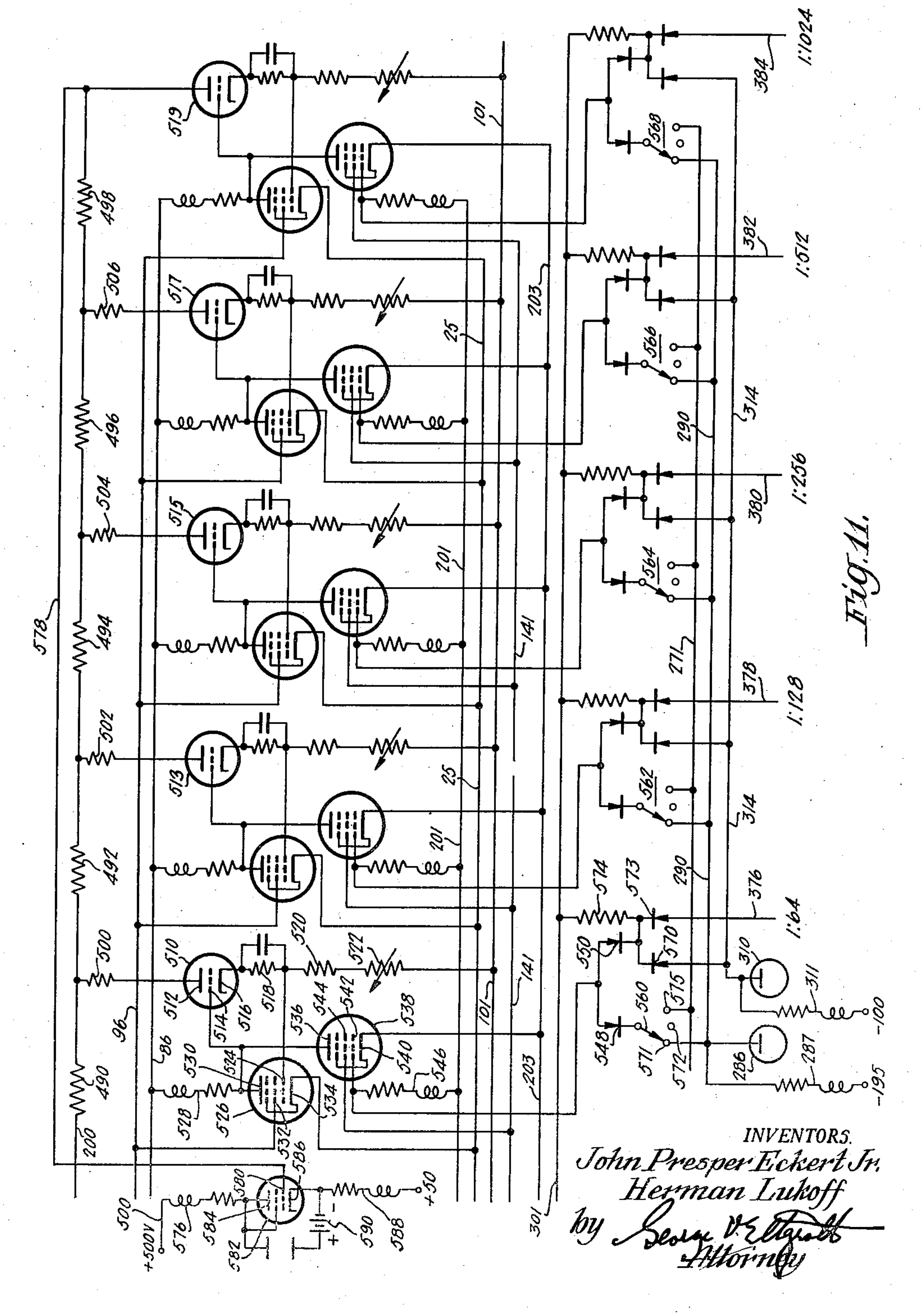
Figure 12:
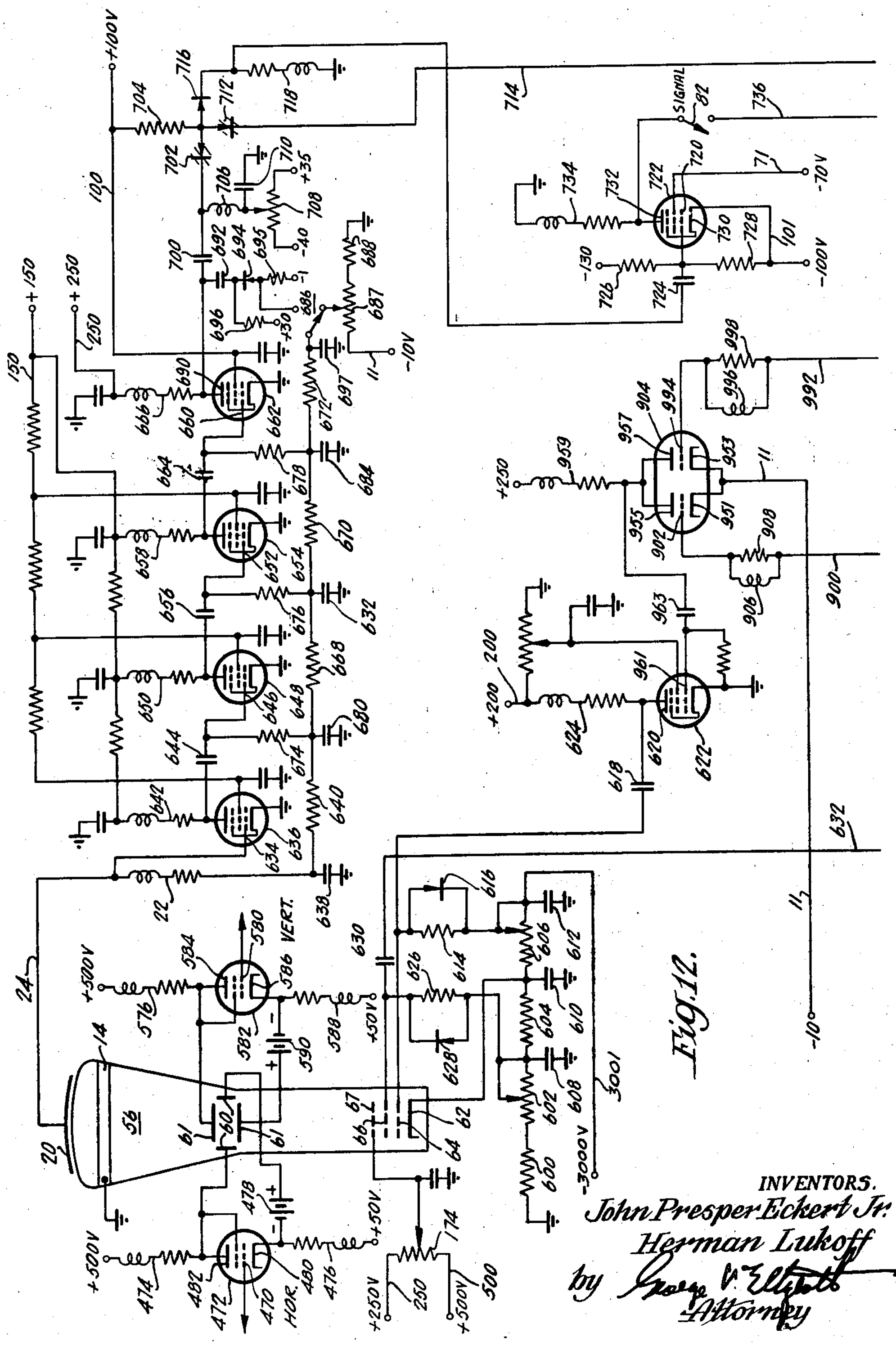
Figure 13:
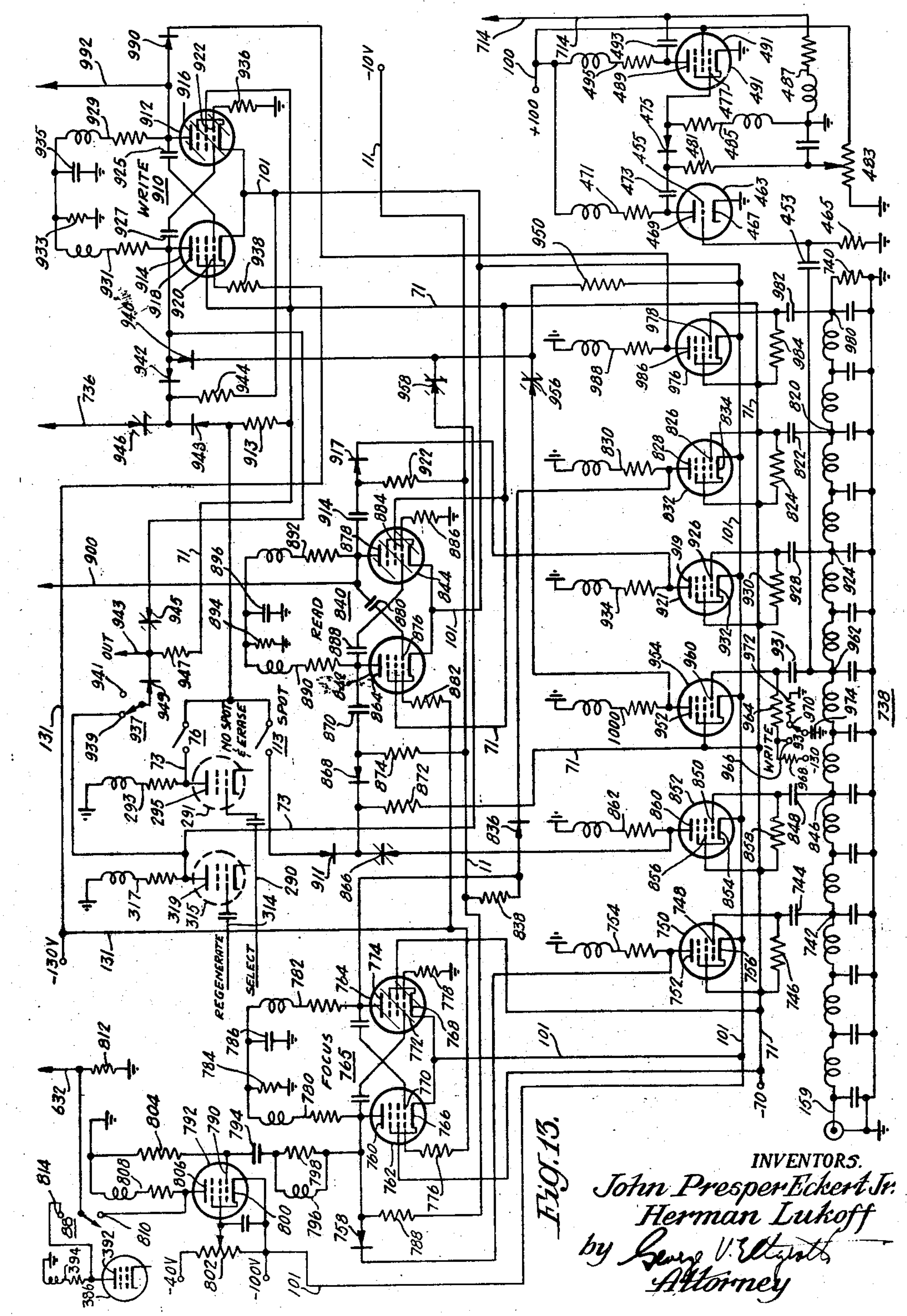

Figure 2*a* illustrates the output impulse observed when the charge pattern of Figure 2 is substituted for that of Figure 1;

Figure 3 illustrates the charge pattern observed when a sharply focused beam of electrons is directed to an area previously occupied by an electron beam of large cross-section;

Figure 3*a* illustrates the voltage output pulse observed when the charge pattern of Figure 3 is laid down on the charge pattern of Figure 2;

Figure 4 illustrates the voltage output pulse observed when a defocused beam of electrons impinges on an area previously excited by a similarly defocused beam of electrons;

Figure 5 illustrates in block form an electric storage system utilizing the principles developed in the foregoing figures;

Figure 5*a* illustrates the storage area distribution on the face of the cathode ray valve;

Figure 6 represents the operating time cycle of the storage system of Figure 5;

Figure 7 illustrates schematically the timing impulse source and counting or divider chain excited thereby, which drives the electric storage system referred to above;

Figure 8 illustrates the divider output stages controlling function selection and the horizontal selection and deflection circuits;

Figure 9 illustrates the divider excited output stages controlling the vertical selection and deflection, as well as the output stage exerting supervisory control over the enlargement of the electron beam;

Figure 10 illustrates the horizontal position selecting and deflection circuits;

Figure 11 illustrates the vertical position selecting and deflection control circuits;

Figure 12 illustrates schematically the cathode ray tube, regeneration amplifier and sampling circuits involved in the storage system;

Figure 13 illustrates schematically the impulse controlled vacuum tube memory system participating in the action of the storage system.

Figure 14:
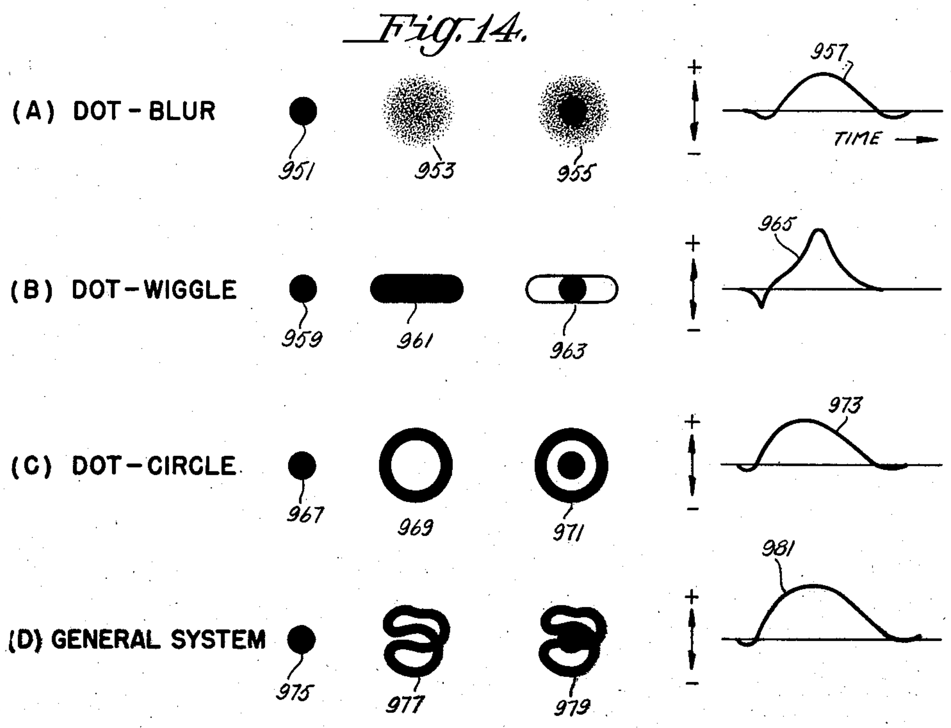
Figure 15:
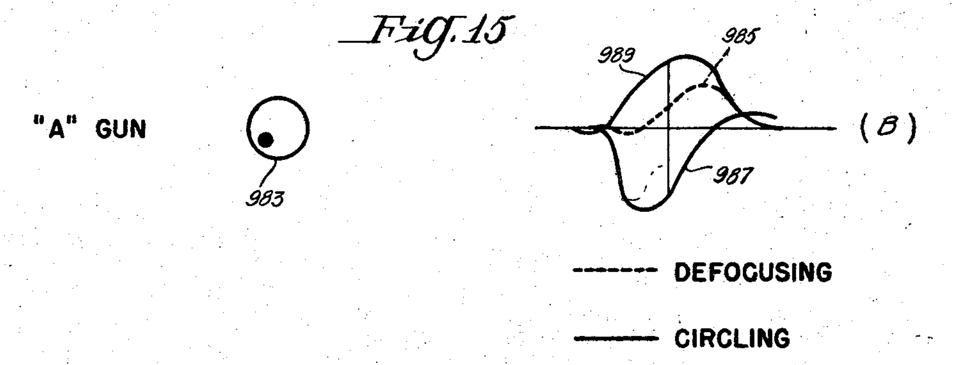
Figure 16:
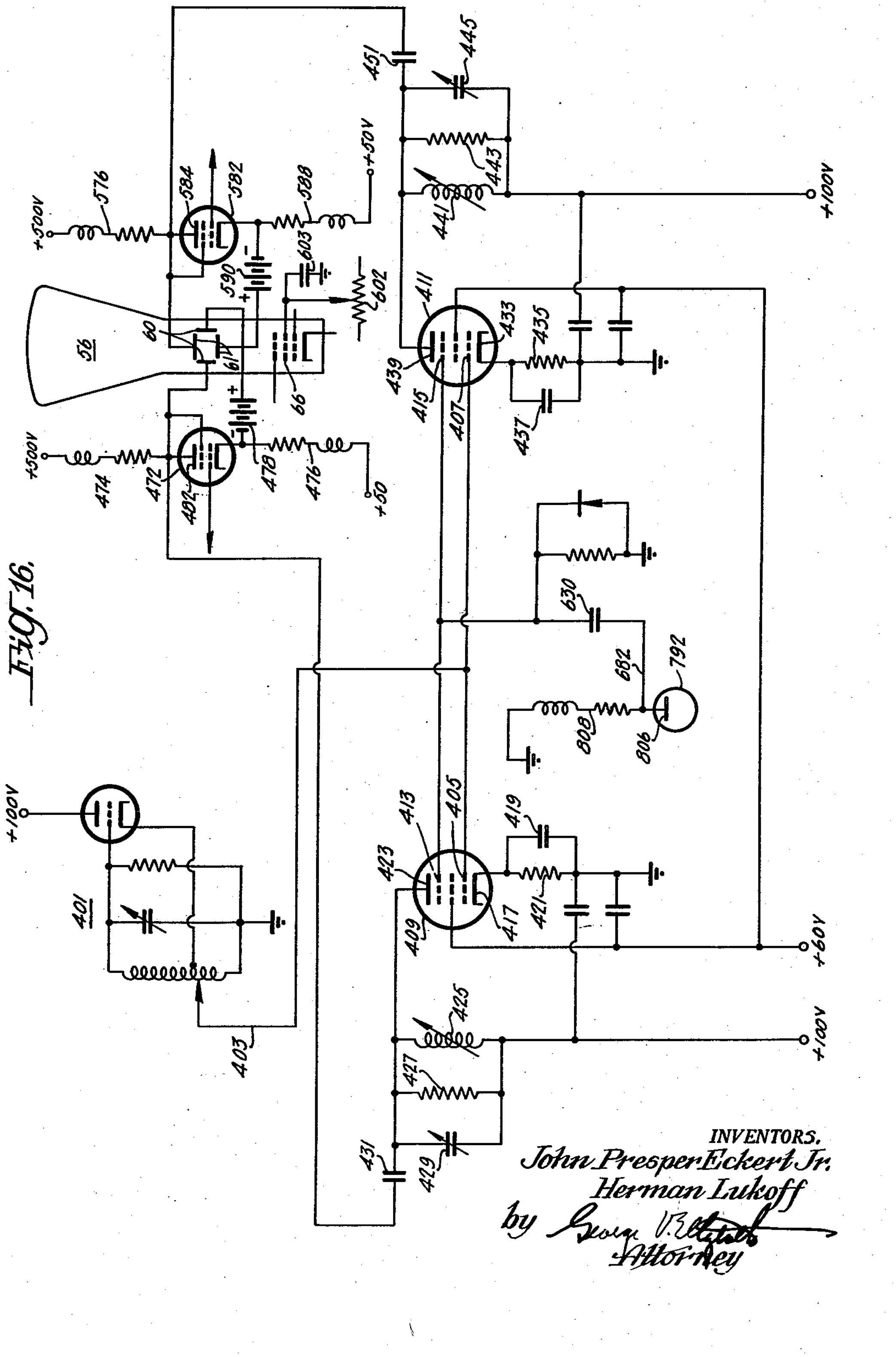
Figure 17:
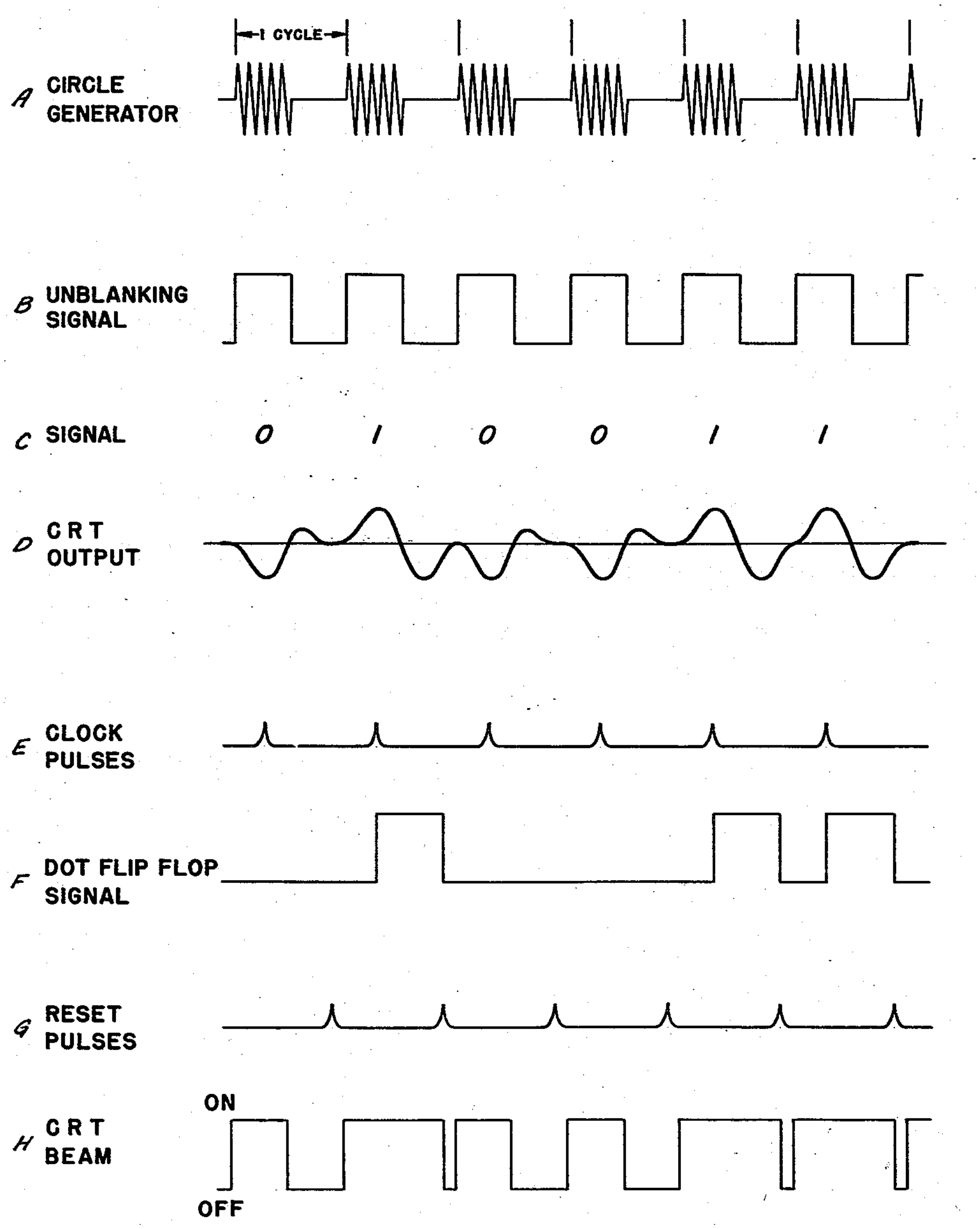

Figure 14 illustrates a plurality of pattern configurations which may be employed in the storage system;

Figure 15 illustrates a defect encountered when one of the foregoing pattern systems is utilized;

Figure 16 illustrates schematically a modification of the earlier described system for generating one of the desired alternative patterns of Figure 14;

Figure 17 is a timing diagram, illustrating the signals found in various portions of the storage system.

Referring now to the drawings, in which like parts are referred to by like reference characters, Figure 1 discloses in section the anterior portion of a cathode ray tube of conventional construction. The envelope 10 may be of glass, and include a flat front face 12 coated with one of the conventional phosphor compounds luminescing under the impact of an electron beam. The presence of the luminescing phosphor on the front wall of the tube is not essential to the operation of the system, as the secondary emissive properties of the envelope itself may be utilized. However, the presence of the phosphor affords an added measure of convenience in permitting visual observation of the storage system action and the use of standard tube types. A final accelerating electrode 14 coats a portion of the interior wall of the envelope 10. An electron beam 16, generated by conventional gun and power supply circuits impinges on the front wall 12 at 18. A pick-up electrode 20, located exteriorally of the envelope 10 is closely associated with the front face 12 and connected with a signal ground through the resistor 22 and to the work circuits by a lead 24. The body of the tube may be provided with the usual electro-magnetic electrostatic shielding, and the end face thereof is further shielded by a demountable electrically conductive collar 26 carrying a similarly conductive shielding screen 28. The mesh of the screen 28 is sufficiently fine to provide the desired degree of electrostatic shielding, while yet permitting visual inspection of the end wall of the cathode ray tube. The collar is apertured at 30 to receive the signal lead 24 extending from the signal pick-up electrode 20. The signal pick-up electrode 20 may comprise a similarly fine meshed electrically conductive screen or a very thin metallic coating deposited directly on the external face of the cathode ray tube envelope.

When the electron beam 16 strikes the internal face of the cathode ray tube end wall, it excites the emission of secondary electrons which leave the end wall and are drawn for the most part to the final accelerating electrode 14. Some of them, however, particularly those emitted with very low velocity or substantially tangentially to the surface of the inner wall of the face 12, fall upon the screen or end wall 12. Over certain voltage ranges, differing with materials, an incident electron beam may cause the emission of more than one electron. Under these circumstances the substance is said to have a secondary emission ratio larger than unity. The voltage of the electron beam of the cathode ray tube referred to in Figure 1 is so selected, in conjunction with the substance of the surface of incidence, as to operate in the region where the secondary emission ratio is greater than unity. Thus, under the influence of the exciting electron beam, more electrons leave the screen at the point of impact than are arriving at the screen. This condition persists until, by reason of the departure of an excess of electrons, the bombarded spot has become sufficiently positive in potential to recapture a sufficient number of electrons to reduce the secondary emission ratio to unity and thereafter the bombarded area is maintained at such potential. The resulting potential distribution observed on the screen under the bombardment of a finely focused beam is shown at 18 in Figure 1, wherein positive potentials are indicated by an ordinate extending upward from the screen 12. The height which this voltage distribution characteristic attains is of the order of 3 to 6 volts. The net loss in electrons from the screen 12, resulting from the bombardment thereof by the incident electron beam, develops a positive signal on the signal lead 24 by virtue of the electric coupling existing between the signal electrode 20 with every operating point on the said screen 12. The wave form of the signal so generated during the initial bombardment is not discussed here as it is not important to the operation of the particular storage system described, though it will be apparent that by the use of proper methods, it might be so utilized.

To avoid undesired displacement of the bombarded area over the face of the screen 12, the cathode ray tube is enclosed within a magnetic and electrostatic shield and is also covered at its front face, by an electrostatic shield assembly comprising a collar 26 slipping over the end of the cathode ray tube and carrying the meshed screen 28. External magnetic and electric fields are thereby prevented from shifting the position of the bombarded area which would produce undesirable effects, later to be described.

It is essential that the signal electrode 20 and the shielding screen 28 be relatively transparent, if observation of the pattern on the face of the cathode ray tube is to be utilized in monitoring or adjusting the operation of the system. Bombardment by the focused beam 16 in this Figure 1 leaves on the inner face of the cathode ray tube a positively charged area of the configuration illustrated at 32, representing substantially the cross-section of the impinging electron beam.

The action in the case of bombardment of the cathode ray tube screen by a defocused electron beam 16 is shown in Figure 2. Here a somewhat larger blur area on the screen 12 is brought up to the positive equilibrium potential. The potential plateau now embraces and obliterates that previously remaining from the bombardment by a focused beam of electrons. The voltages developed at the signal lead 24 when a defocused electron beam bombards the spot previously excited by a focused electron beam, is shown in Figure 2*a*. This figure illustrates the time variation of voltage observed on the signal lead 24 as a defocused beam is turned on and off, bombarding a spot previously excited by a focused beam. The wave forms illustrated were observed with a cathode ray tube of the type commercially designated as 5CP1A, having a signal electrode in contact with the envelope and a resistor 22 of 10,000 ohms. The peak voltages observed are of the order of 10 millivolts. As the beam is turned on at a time corresponding to 38 on the abscissa, the arriving electrons create a negative charge in the region of the screen, which with the space charge resulting from the accumulation of slowly travelling released secondary electrons, develops a negative going impulse at the time 40 after beam turn-on. As secondary electrons continue to pile-up in the space charge around the bombarded area, a point is reached where more of them depart than there are arriving new electrons, whereupon the positively poled impulse 42, which may have a magnitude of the order of 10 millivolts, is developed about 0.4 microseconds after beam turn-on. Thereafter, the impulse dies away exponentially, as long as the beam remains on. At the time the beam is turned off, the space charge is dissipated resulting in a further positive impulse at 43.

The charge area resulting from the bombardment of a dot with a blur (reading a "1"), as is the case in Figure 2, is shown at 34, the large dark area representing the region newly bombarded under these conditions, with the internal clear circle representing the dot previously present.

The conditions observed when the area previously bombarded by a defocused beam is subjected to the action of a focused beam of electrons (writing), may be seen in Figure 3. In this case the secondary electrons resulting from the bombardment of the focused beam are attracted to the positively charged regions of the screen immediately surrounding the dot, thereby dissipating the former positive charge and reducing the screen area which is maintained at a positive potential. There is thus, a net gain in the number of electrons on the inner face of the end wall, to produce a negatively poled impulse across the load resistor 22. The time relationship of events is illustrated in Figure 3*a*. The beam is turned on at 44. Thereafter, the gain in the net number of electrons on the inner wall of the cathode ray tube face begins, peaking at a time corresponding to 46 on the voltage-time characteristic, subsequently decaying exponentially. As before, this peak has an amplitude of the order of 10 millivolts and occurs in the region of $\frac{3}{10}$ microsecond after the beam turn-on. After the beam is turned off at time 48, the dissipation of the electron space charge results in a positive impulse of the nature previously noted in Figure 2*a*. The charge pattern appearing in the case of Figure 3 is shown at 45, in which the shaded area represents the newly bombarded area, while the outline delineates the bounds of the former charged region. As was earlier noted, bombardment by a focused beam produces a dot or much smaller positively charged region.

Although no pictorial showing of bombardment of a defocused spot by a defocused beam has been made, the phenomena observed in such instance will be immediately apparent from consideration of the previous observations. The voltage-time characteristic of Figure 4 observed in the case of such blur-blur bombardment (reading a "0") indicates that immediately after beam turn-on at 47, an electron space charge is developed in the region of the bombarded screen, giving rise to the negative impulse 52, which dies away exponentially with the stabilization of the space charge condition. Thereafter, no change in potential is observed until the turning off of the beam at 54, when the dissipation of the space charge results in the positive impulse earlier referred to.

As will be described in detail later, voltage impulses observed in Figures 2*a* and 4 are utilized for memory purposes, with the phenomenon of Figure 3 being utilized to reestablish a previously existing pattern, if such pattern has been earlier memorized. It is to be borne in mind, that the significant distinction utilized for information storage purposes is the fact that when a previously bombarded smaller area is bombarded by a beam of relatively larger cross-section at the point of impact, there will be observed, at least during a part of the operating cycle, a positive impulse, whereas when a previously bombarded area is again bombarded by an electron beam of relatively the same cross-section at the point of impact, no positive signal is observed except at the time of beam turn-off. The action described in connection with Figure 3 is of interest in the information storage system, since it describes the method by which an area previously bombarded by an electron beam of relatively large cross-section, can be restored to the charge conditions obtaining in the presence of bombardment by a beam of relatively small cross-section.

A storage system of the type described is illustrated in diagrammatic block form in Figure 5. Gates and buffers are indicated throughout by symbolic notations employing a ring and central dot. The connection from the central element is the output lead, while the lines contacting the outer ring are input leads. Gates are indicated by the attendant character "G," while buffers are indicated by the attendant character "B." When a gate is conditioned so that it only passes a signal when a certain lead is excited, the lead is identified by an arrow head. Gates having more than one arrow-tipped input lead require simultaneous excitation of all. When a gate is conditioned to normally pass a signal, but such condition is periodically interrupted, the exciting lead producing this change is provided with a smaller circle at the point of contact. This type of gate may be referred to as an inhibitory gate. A cathode ray tube 56, of the conventional electrostatic deflection type, such as the 5CP1A or 7JP1 is mounted within a conductive magnetic shield 58 which may be of properly annealed mu-metal or other high permeability alloy, with its face 12 adjacent the signal electrode 20 which is located within the electrostatic shielding screen 28 covering the opening of the shield 58. The signal lead 24 from the signal electrode 20 is connected with the input of a conventional amplifier circuit 80 passing the necessary frequency range. As will be brought out later, the upper end of this frequency range will be determined by consideration of the methods utilized for the production of large effective beam cross-sections. However, when the dot-blur, dot-wiggle, or the dot-circle systems of information storage are utilized, all of which terms will be later defined, an amplifier with an upper frequency limit of the order of two (2) megacycles per second will be satisfactory. The cathode ray tube 56 is provided with a pair of horizontal deflecting electrodes 60 and vertical deflecting electrodes 61 between which an electron beam, which is originated within the electron gun assembly comprising a cathode 62, an intensity control electrode 64, a first anode or focusing electrode 66 and a second anode 67. A conductive coating 14 on the inner surface of the flared portion of the envelope serves as the final accelerating electrode and may be connected to ground via the connecting band illustrated. The horizontal and vertical deflecting electrodes 60, 61 are connected with the sweep and memory selector circuit generally indicated at 68. A bank of switches 69 selects the spot location on the screen which is to receive or deliver information. In the system described, the circuits utilized in the element 68 may be of the type which is conveniently termed a "jump" sweep. In this class of sweep, the beam developed spot is moved as abruptly as possible from one predetermined location on the screen to another. The sweep circuit which is used for the purposes of illustration, develops a block of memory locations, appearing as an array of 32 x 32 luminous storage areas when the system is in operation. Assuming for reference purposes, the first spot on the bottom line may be labelled "0" as shown in Figure 5*a*, the next location "1," then "2," "3," "4," "5," "6" . . . "31." During the regularly repeated portion of the function cycle, these areas are probed and regenerated in this sequence. Thereafter, the vertical sweep circuits displace the beam a distance corresponding to the space between successive lines in the storage pattern, and the same process is repeated on line "1." Thereafter, lines "2" . . . "31" are treated similarly, after which the operating cycle is resumed at position "0" in line "0."

Electrons emitted from the thermionic cathode 62, travel through the intensity control electrode 64, which is controlled from the buffer stage 70.

The first or focusing anode receives its excitation under the control of the focus flip-flop 72, while the second anode 67 is connected to the movable tap on the astigmatic control potentiometer 174, whose end terminals are connected respectively with plus 200 and plus 500 volts. The cathode 62 may be maintained at a potential of minus 3000 volts by any suitable power supply, not here illustrated.

The operation of the entire system is referred to and controlled by the clock generator 75, which may develop repetitive impulses of relatively small duty cycle at a rate of 400,000 per second. The output of the clock generator, a train of pulses of approximately 0.2 microsecond duration, is applied to the input of a chain of binary counter stages 77 and to a properly terminated delay line 85.

The counter chain includes 12 stages in all, the first of which may be identified as the "F" stage serving to select the function performed by the storage system at any instant of time. The following 10 stages, numbered consecutively from 1 to 10, are connected in cascade and deliver the voltages controlling the sweep and selector circuits of the element 68. The last stage, numbered 11 in Figure 5, is one incorporated for convenience in performance of certain tests and plays no direct part in the handling of information. The "F" stage of the counter chain alternatively excites the leads 73 and 74, governing respectively the arbitrary selection of the active area on the screen ("select" portion of the function cycle) and the systematic performance of the regeneration process ("regenerate" portion of the function cycle). In addition, the lead 73 is connected through a normally open switch 76 with a conductor 175 leading directly to the inhibitory gate 79, and, through a normally open switch 113 to inhibitory gate 87.

The inhibitory gate 79 receives energy from the output of the amplifier 80 through the normally closed switch 82 and the sampling gate 78. The inhibitory gate 87 is connected between the second tap on the delay line 85 and the setting input to the reading intensity flip-flop 84, whose output is delivered to the buffer stage 70 and then to the intensity control electrode 64 of the cathode ray tube 56.

The first tap on the delay line 85 is connected to the "set" terminal of the focus-controlling flip-flop 72, whose output is delivered to the focus control electrode 66 of the cathode ray tube 56 through the single-pole, double-throw switch 88. In one position of the switch 88, the focus control electrode is connected with the focus control 72, and in the other to the counter stage 11 of the chain 77. The switch 88 might be called the automatic cycling switch. A third tap on the delay line 85 is connected via the lead 89 with the timing gate 78 and the writing control gate 90, whose other input is connected with the regeneration control line 74. A normally open "write" switch 93 connects the output of the gate 90 with an input to the buffer stage 91, whose other input is derived from the output of the inhibitory gate 79 earlier referred to. The output from the buffer stage 91 connects with the "set" input to the "writing" control element 94 whose stimuli join the output from the reading control unit 84 in the buffer 70.

The fourth tapped connection 97 to the delay line 85 leads to the reset terminal of the reading control unit 84, while the fifth tapped connection 99 to the delay line 85 conveys impulses to the reset terminal of the focusing control unit 72. The writing control 94 is cleared by impulses delivered from the sixth connection 102 to the delay line 85 through the isolating diode 103 and coupling capacitor 106 to the lead 104, from which lead may also be derived a train of output pulses.

With the foregoing organization of the system in mind, its overall operation may be readily comprehended. Let it be first assumed that normal operating voltages have been applied to the system, and that the astigmatism control potentiometer 174 has been set to provide an average deflecting potential representing the best compromise setting permitting minimum spacing of the elemental memory areas on the screen 12 of the cathode ray tube 56. The signal switch 82 is closed, the "write" switch 93 is open, the erase switch 76 is open, the spot switch 113 is open, while the switch 88 is in the right hand position. The memory or storage system now operates normally, retaining such information as may be placed in it, without the introduction of any new material.

In general, with the application of starting power, the accelerating voltages on the cathode ray tube 56 rise sufficiently slowly, that there is insufficient output voltage to the output lead 24 for actuating the writing unit 94, described later, as the storage pattern of zeros is first established. The clock generator 75 is now delivering its 0.2 microsecond impulses at 400 kcs. to the counting chain 77 and to the delay line 85. The total delay line length may be of the order of 2 microseconds, with the six taps emanating therefrom spaced at a distance providing progressive delay of a period somewhat less than that of the clock generator. In the particular apparatus constructed, the delay line length was approximately 2 microseconds. The counter chain 77 acting in conjunction with the sweep and selector circuits 68, drives the electron beam systematically over the screen of the cathode ray tube 56, during the "regenerate" portion of the function cycle and alternately, under the control of the "F" stage of the counter chain 77, bombards a screen area arbitrarily selected by the setting of the switch bank 69, during the "select" portion of the function cycle. When the output selector switch 110 is in the "select" position the output gate 109 passes only the impulses observed during the "select" phase of the counter stage "F," while when in its "open" position, the gate 109 passes all impulses observed at the output of the "write" flip-flop 94, as might be desired during a test operation. The sequence of operations in response to the transit of pulses down the delay line 85 is as follows:

Because the switch 88 is in the right hand position the impulses arriving at the first tap on the delay line 85, excite the focus control unit 72, which prepares the conditions in the electron gun for the projection of a defocused electron beam of relatively large cross-section on the screen. Thereafter, the impulse arrives on the second tap of the delay line 85 and is passed to the set terminal of a reading intensity control unit 84, since the inhibitory gate 87 is open by virtue of the open circuit existing at the erase switch 76. The setting up of the flip-flop unit 84 passes an impulse through the intensity buffer 70, delivering an unblanking signal to the intensity control electrode 64, permitting the projection of a defocused beam of electrons. As the voltages in the system have risen gradually since the time when the apparatus was energized, there already exists on the screen 12 at the point of bombardment a positively charged area of relatively large cross-section corresponding to the showing of Figure 2. The rebombardment of such a spot by a large cross-section electron beam produces negatively poled impulses which are amplified by the unit 80 and sampled in the sampling gate 78 which receives its controlling impulse from the third tap on the delay line 85 approximately 0.4 microsecond after the excitation of the second tap on the delay line 85. As the lead 175 is not energized with the switch 76 open, the inhibitory gate 79 responds to the sampled negatively poled impulse to deliver a signal through the writing buffer 91 to the writing control unit 94. However, the writing control unit 94 requires an impulse of different polarity for tripping and, hence, is not set up, so that the line 104 to the intensity buffer is not excited.

Thus, when the impulse travelling down the delay line 85 arrives at the reset lead 97 to the reading control unit 84 and resets this unit, the intensity buffer 70 passes an impulse interrupting the electron beam, which is not reestablished during the remainder of the cycle. Thereafter, the delay line impulse arrives at the reset terminal of the focus control unit 72, resetting same to the conditions for the projection of a finely focused beam, but since the beam has already been interrupted and is not re-established during this cycle, this is without effect on the apparatus.

Arrival of the delay line impulse at the sixth and last tap on the line 85 excites the reset terminal of the writing unit 94, but since this unit has not been set up, this is without effect on the output line 104.

Remembering that the beam remains in each selected position for approximately 2½ microseconds, let it now be assumed that the defocused beam bombards a region previously occupied by a focused beam; that is, a dot is bombarded by a blur. Shortly after the actuation of the counter chain 77 conditions the positioning circuits to bombard the selected area and during the excitation of the "regenerate" lead 74 connected with the function selecting stage "F" of the counting chain, the impulse travelling down the delay line 85 sets up the focus control unit 72 to establish the conditions for the projection of an unfocused beam of electrons. A few tenths of a microsecond later, the impulse on the delay line 85 arrives at the lead 112 and travels via the inhibiting gate 87 to the set terminal of the read control unit 84. The actuation of the unit 84 releases the blanking bias from the intensity control electrode 64, permitting the projection of the unfocused beam of electrons on the selected area of the screen 12 of the cathode ray tube 56. It is important that the delay in impulse arrival at the lead 112 be sufficient to permit the stabilization of the voltages provided by the sweep circuits in 68, so that there is no further substantial displacement of the bombarded area during this period. Since the bombarded area was previously occupied by a charged region of relatively small area, which is now expanded by bombardment with the defocused electron beam, a positive impulse is applied to the amplifier 80 which travels through the switch 82 to the sampling gate 78, conditioned for the passage of this impulse a few tenths of a microsecond after the initiation of the bombarding beam and remaining so conditioned for the duration of the delay line impulse, approximately 0.2 microsecond in the instance under consideration. Thence, the sampled and timed signal passes through the inhibiting gate 79 to the write buffer 91 and arrives at the set terminal of the writing control unit 94 with a polarity such that this device, which may be a flip-flop, is actuated.

In response to such actuation an impulse is delivered from the reset terminal through the lead 104 to the intensity control buffer 70 and establishes the condition for the continuation of the electron beam after the resetting of the reading control unit 84 in response to the subsequent arrival of the control impulse along the delay line 85. As the control impulse continues to travel down the delay line 85, it arrives at the lead 99 and is applied to the reset terminal of the focus control unit 72, which returns to its normal condition, establishing the requisite voltages for the projection of a sharply focused beam of electrons on the screen 12 of the cathode ray tube 56. The beginning of the projection of the focused beam of electrons on the screen 12 begins in the neighborhood of one microsecond after the initiation of the operating cycle, that is, about one microsecond after the establishment of the regeneration cycle by the "F" stage of the counter chain.

During the remaining microsecond, the projection of a focused beam of electrons on the screen 12 continues, effecting the change in the charged area illustrated in Figure 3, thereby re-establishing the small charged area originally postulated. At the end of the regeneration cycle re-establishing the pattern initially present, the delay line impulse arrives at the sixth tap, passing through the lead 102 to reset the write unit 94 which removes the unblanking impulse delivered to the intensity control electrode 64 through the buffer 70. This interrupts further passage of the electron beam through the gun assembly. The foregoing has clearly established the capacity of the system to regenerate and maintain continuously on the screen 12 such charge paterns as may be originally present, be they blurs or dots; i.e., large areas or small areas.

The entire cycle allotted to the performance of the regeneration consumes 2.5 microseconds, and each point is regenerated once every 3120 microseconds, about 3200 times per second. The intermediate 2.5 microsecond periods are devoted to action connected with selected areas of the storage group. Inasmuch as the charged areas have been found to retain their identity and identifiability for periods of one or two seconds, it is clear that the information present in the various charged patterns may be retained indefinitely when the patterns are replaced at the rate of several thousand times per second. The frequent erasing and re-establishing of the charge patterns has the further advantage that the patterns need not always remain on the same point of the screen 12, but may shift gradually thereover in response to changes in line voltage and the influence of various extraneous factors such as magnetic and electric fields, so long as displacement of the beam during successive regeneration periods associated with the same screen storage area do not exceed the dimensions of the spot produced by the focused beam. High frequency fields are prevented from affecting the position of the storage pattern by the shields 26 and 58, which also prevent disturbance of the operation of the system by electric impulses of extraneous origin.

Since the storage system starts operation with blurs in all the storage areas, it will be convenient to consider the blur as a "0" and the dot or focused spot as a "1." Assuming the storage area to be loaded with "zeros" it is of interest to consider the method of introducing a "1" in any desired position. The switch bank 69 is set to select the desired storage area. Thereafter, the write switch 93 is actuated, the switch 82 also remaining closed while the switch 88 is in its right hand position. The following sequence of events now occurs. As the clock generator 75 drives the counter chain 77 through its operating sequence, the system is progressively sequenced through its normal regeneration cycle under the influence of the "F" and remaining stages of the counter chain 77. During every other cycle of operation, however, the "select" bus 73 from the "F" stage is excited, while the "regenerate" bus 74 is de-energized. Excitation of the "select" bus 73 brings the beam to the selected storage area on the screen 12 of the cathode ray tube 56, while the de-energization of the "regenerate" lead 74 removes the inhibitory bias from the write gate 90. Each time during the "select" portion of the operating cycle that an impulse arrives on the line 89 from the third tap on the delay line 85 and the write switch 93 is actuated, an impulse is passed through the write gate 90 which, as will be remembered, controls the continuation of the projection of the electron beam during the time interval in which the focus unit 72 is in condition permitting the projection of a focused electron beam. Since the output of the write buffer 91 contains the signal necessary to set up the writing control unit 94, regardless of the nature of the signal observed at the signal plate 20, a dot will be established within the storage area after which the "write" switch 93 may be opened, whereupon the unit digit so stored will be maintained by regeneration in the manner previously described.

The method of removal or erasure of a unit digit stored in any selected memory position is next of interest. To perform such function, switch 76 is closed while the switch 113 remains open. Signals from the delay line 85 continue to pass through the inhibitory gate 87 and actuate the reading control unit 84 to project a defocused electron beam on the selected storage area. The closure of the switch 76, however, impresses an inhibitory voltage via lead 175 on the inhibitory gate 79 preventing signals developed at the signal electrode 20 from passing through to the write buffer 91, whereby the writing control unit 94 is prevented from setting up to deliver a focused beam of electrons after the reading control unit 84 has shut off the beam. A momentary closure of switch 76 will, therefore, clear the selected storage area of a "1" and restore it to "0."

It will be evident from the foregoing considerations that the spot or storage area set up on the selector switch bank 69 will be bombarded 1025 times for each bombardment of a storage area subjected only to normal regeneration action. This number is arrived at by summing up the 1024 bombardments occurring during the activation of the "select" line 73 by the function selecting stage "F" of the counter chain 77 and once during the normal regeneration cycle. Over a period of time, such an excessive bombardment may damage the screen or front wall of the cathode ray tube 56 and, when information is to be stored for long periods of time, may be suppressed by closing the switches 76 and 113. When these circuits are completed suppressing signals are delivered to the inhibitory gates 79 and 87, preventing the activation of the writing control element 94 and the reading control element 84, respectively. Thus, at no time is the beam turned on during the "select" portion of the operating cycle devoted to the accommodation of the storage area set up on the switch bank 69. It will be noted, however, that this does not interfere with the normal regeneration cycle, as, during "regenerate," the "select" lead 73 is de-energized, removing the inhibitory signals from the gates 79 and 87.

Depending upon the setting of the output selector switch 110 which controls the output gate 109, there may be delivered to the output terminal for observation, either a train of impulses resulting from both the "regenerate" and "select" operations, or impulses controlled only by the selected storage area. If the switch 110 be in the "select" position, the excitation of the lead 73 opens the output gate only during the "select" portion of the function cycle. The presence of a "1" in the selected storage area will now signal its presence by a train of impulses of predetermined polarity, in this case positive, repeated at 5 microsecond intervals, while a "0" in the selected storage area will produce no output.

With the output selector 110 in the open position, all impulses appearing at the reset terminal of the write control unit 94 pass through the output gate 109.

It may frequently occur, during the initial test and adjustment of such apparatus, that it is desired to continuously monitor the signal resulting from the establishment of a blur pattern on a dot, or of a dot pattern on a previously blurred area. The apparatus so far described includes provisions for automatically performing this in predetermined sequence. To establish this mode of operation, the signal switch 82 is opened and the observation oscilloscope connected with the output of the amplifier 80. The switch 88 is thrown to the left hand position whereby the electron beam is focused and defocused during every other operation of the counter chain 77 up to and including the tenth stage 10. With normal operating voltages now applied, the generator 75 drives the counter chain 77 through its normal operating sequence. During the first 1024 counts, excluding the action of the "F" stage we shall assume that the output of stage 11 of the counter chain is such as to defocus the electron beam. As, due to the opening of switch 82, the normal regeneration cycle is interrupted, in view of the consequent disabling of the writing control device 94, 1024 blurred areas are laid down in the storage locations on the face of the cathode ray tube 56. During the next 1024 counts in the counting chain 77, stage 11 changes condition to remove the defocus signal from the cathode ray electron gun. As a consequence, when the beam is established by the arrival of the clock impulse at the second tap on the delay line 85, it is projected as a focused beam on the area previously bombarded by a defocused beam, and there may be observed at the amplifier output 80, a train of impulses corresponding to such substitution. After 1024 such substitutions have been completed, the defocus signal is again applied, whereupon the next 1024 bombardments of the elemental storage areas occur with a defocused electron beam, delivering at the output of amplifier 80 a train of impulses characteristic of such substitution. The oscilloscope utilized for observation may be synchronized from the output of stage 11 of the counting chain to view only a single one of such repetitive substations, either blur on dot, or dot on blur. With this display before the operator, it is possible for the operator to conveniently and quickly adjust operating potentials, such as blanking levels, pulse widths, etc. to provide the optimum output signal.

The operating sequence may be readily understood by reference to Figure 6 illustrating the allocation of time periods to the performance of various functions. At the time 114, the counter chain 77 is indexed to its next position. A few hundredths of a microsecond later, at 115, the operating impulse travelling down the delay line 85 sets up the condition necessary for the projection of an unfocused beam of electrons. After a delay of perhaps another 0.1 microsecond the impulse travelling down the delay line 85 reaches and actuates the read control circuits, turning on the electron beam, at 116. The time delay between 114 and 116 is sufficient for the sweep voltages to have stabilized for a time guaranteeing relatively negligible movement of the electron beam, after its establishment. Somewhat later, the delay line impulse is delivered to the timing gate, sampling and delivering to the writing control unit 94 an impulse whose polarity is controlled by the nature of the substitution which the apparatus has just observed. If a blur on a blur, the output impulse is negative in character and leaves the write control unit 94 unaffected, while if a blur on a dot, the opposite polarity is observed, and the write control unit 94 is set up thereby. The timing impulse ceases at 118 about 0.2 microsecond after its beginning, but by this time if a blur for a dot substitution was made at the active storage area, the write control unit 94 will have been set up so that when the reading control unit 84 acts to interrupt the electron beam at 119, the output voltage from the writing unit 94 permits continued beam projection. A short time thereafter at 120, the delay line impulse resets the focus control unit 74, restoring the conditions necessary for the projection of a sharply focused beam of electrons, which projection continues from the time 120 when the focus control unit is disabled, until the final shut off time 111 when the delay line impulse resets the writing control unit 94. A few tenths of a microsecond later this operating cycle is concluded and a similar one repeated, with the sweep voltages for the electron beam shifted to an extent indexing the beam to the arbitrarily selected area, assuming the cycle just described was devoted to systematic regeneration.

While the foregoing analysis of the theory and the block diagram have undoubtedly made clear the basic principles of operation of the invention, it will undoubtedly be of assistance to consider in detail the operating circuits involved. To this end reference is made to Figure 7, illustrating in schematic form the circuits involved in the generation of the precisely timed voltages to which the operation of the entire system is referenced. In these schematic illustrations, it has not been felt necessary to treat in detail the heaters or energizing circuits therefor associated with the thermionic cathodes, or the various power supplies as these are well-known in the art. In interest of convenience in following through the circuit diagrams, all power supply leads have been given reference characters as near as practical to their operating voltage levels. All voltages are given with respect to ground and those which are positive with respect to ground are identified by even reference characters, while those which are negative with respect to ground are identified by odd reference characters. All timing is controlled by the quartz resonator 121 connected between the control grid 122 and the cathode 123 of the thermionic valve 124 whose anode 132 is connected to a source of high voltage through the adjustable oscillatory circuit 125. The usual anode filter choke 126 and decoupling capacitor 127 connected with ground are also provided. The valve 124 is provided with a space charge grid 128 connected with ground potential while its cathode 123 is returned through a resistor 129 to the lead 141 maintained at approximately minus 140 volts with respect to ground.

A feedback capacitor 130 is connected between the anode 132 of the valve 124 and the control grid 122, said grid being returned to the negative terminal of its associated high voltage source through grid leak 133. The bias resistor 129, connected in the cathode circuit is shunted by the by-pass capacitor 134.

The inherent stability of a quartz crystal resonating element is further improved by maintaining its temperature at predetermined levels, and to this end there is thermally associated with the quartz resonator 121 a heater 135 connected to a source of electric energy represented at 136 through a thermally responsive switch 137, the latter switch being thermally associated with the quartz crystal 121. The operation of such crystal oscillators is well-known and will not be discussed in detail here. Suffice it to say that there is produced at the anode 132 an intense oscillation of frequency controlled primarily by the resonator 121, but in subsidiary fashion by the resonant circuit 125 and the capacitor 139 shunting the quartz resonator. These oscillations are impressed on the control grid 140 of the driver valve 142 through the coupling capacitor 143. The control grid 140 is also connected with the negative lead of the high voltage supply for the valve 142 through the choke 145, and the grid leak 146, which latter is shunted by the capacitor 147. The valve dissipation in the absence of excitation, is limited by the interposition of resistor 148, shunted by by-pass capacitor 149, between the cathode 151 and the power lead 141. The anode 152 of the driver valve 142 is connected through the primary of the pulse transformer 157 with the source 240, grounded for high frequency currents by capacitor 144. Voltage for the space charge grid 153 of the valve 142 is derived from the source 240 through a resistor 154 whose space charge grid end is also connected with the anode 155 of a regulating valve 156.

The secondary of the pulse transformer 157 has one side connected to the outer sheath 160 of a co-axial transmission line, while its other side is connected, via the central conductor 159 thereof, with the various work circuits located in the storage system. In addition the central conductor 159 of the co-axial line 159, 160 is connected via the coupling capacitor 162 and the diode 164 to the control grid 166 of the control valve 156. Operating bias for the control grid 166 of the control valve 156, whose cathode 167 is connected with ground, is provided by returning the grid circuit to the junction of resistors 175, 176 bridged between the source line 141 and ground. This junction point is grounded for high frequency currents by capacitor 178 and is connected with the two sides of the diode rectifier 164 by resistors 168 and 170, respectively. The rectified output of the diode 164 is smoothed by capacitor 172 bridging the resistor 168.

The voltage developed at the anode of the oscillator valve 124 is of considerable amplitude, and drives the control grid 140 of the driver valve 142 into the grid current region, biasing this valve to the point where it conducts only on the peaks of the input to the driver stage. Thus, the output wave form is substantially of the nature illustrated at 180. It is desirable that the output amplitude delivered from the pulse transformer 157 be maintained as nearly constant as possible, and to this end the control valve 156 is provided. This valve is normally biased strongly negative with resultant relatively low anode current drain, permitting the application of a relatively high voltage to the space charge grid 153 of the driver valve 142. In response to the positively poled impulses applied to the capacitor 162, a positive voltage is developed at the control grid 166 of the control valve 156, opposing the negative bias just referred to, and tending to increase the anode current, thereby reducing the voltage of the space charge grid 153 to diminish the amplitude of the output pulse train 180. Once these levels have been properly set, aging of the tubes or a shift in circuit voltages is compensated for by the automatic regulatory action. The impulses 180, which may conveniently be referred to as clock pulses, are therefore delivered at standardized level to the various components of the apparatus making up the storage system.

One of the important units is the counter chain to which earlier reference has been made. A sufficient number of the counter stages have been illustrated in schematic detail in Figure 7 to permit the ready comprehension of the structure of the balance of the chain which are indicated in block diagrammatic form.

The first or "F" stage of the counter chain 77 may include a pair of input valves 182 and 184 and a dual triode counter valve 186. The anodes 188 and 190 of the input valves 182 and 184 are connected with the source lead 250 through the load resistors 192 and 194, respectively, also being coupled by capacitors 200 and 202, respectively, with the anodes 198 and 196 of the counter valve 186, which are also connected through compensated loads to the source line 100. In addition, the suppressor grid 204 of the input valve 182 is connected through the resistor 205 with the anode 198 of the counter valve 186 and the suppressor grid 206 of the input valve 184 is connected through resistor 207 with the anode 196 of the counter valve 186. The rise of voltage at the suppressor grid 204 is delayed by capacitor 209 connected between said grid and the cathode 216, while the rise of voltage at the suppressor grid 206 is similarly delayed by the connection of a capacitor 213 between said grid and cathode 220, which is also connected with the cathode 216 and thence to the supply lead 98. Each of the valves 182, 184 is provided with a space charge grid 208 and 210, respectively, returned to the supply line 200, while their control grids 212 and 214 are connected together and through the common compensated grid return 215, 217 to the supply lead 92. The cathodes 226, 228 of the counter valve 186 are connected with ground, and the anode 198 is coupled to the grid 222 through the capacitor 234, the grid return being provided by a resistor 230 being connected with the supply line 92. In similar fashion the control grid 224 is coupled with the anode 196 through capacitor 236, and the grid return therefor provided by resistor 232 connected between this grid and the supply line 92. The output signals, appearing at half the input frequency, are delivered to the output lead 238 from the anode 198 through the compensated link 242.

In considering the operation of this circuit, it may be assumed that one side of the counter valve 186 is in the conducting condition. For convenience, let it be assumed that this is the side including the anode 196. The next positive impulse arriving on the line 159 passes through coupling capacitor 244 to arrive at the control grid 212 of the input valve 182, developing a negative impulse at the anode 188 which is transferred to the anode 198 of the counter valve 186. At the same time the grid 222 of the conductive side of the valve 186 is driven negative, diminishing the flow of anode current and developing an anode impulse coupled to the opposing control grid 224 to establish conduction at the anode 198, which falls in potential and impresses, with some delay caused by the capacitor 209, a negative voltage on the suppressor grid 204 of the input valve 182 through the resistor 205.

Upon the arrival of the next subsequent positive impulse from the line 159, the negative voltage on the suppressor grid 204 of the input valve 182 prevents the appearance of an anode current pulse through the resistance 192 and hence is without influence in this portion of the circuit. The same impulse is simultaneously impressed on the control grid 214 of the input valve 184, however, and this valve, it will be noted, has a positive potential applied to its suppressor grid 206, since the flow of current to anode 196 was cut off during the previous cycle. Therefore, this positive impulse on the line 159, now impressed on the control grid 214, develops a negative going impulse across the resistance 194, which is coupled to the control grid 224 through capacitors 202 and 236, as well as directly to the anode 196 through the capacitor 202. The resultant decrease in flow of anode current to anode 198 develops a positive impulse impressed on the control grid 222 through the capacitor 234 to establish the flow of current to anode 196, restoring the counter to its initial condition. The flow of current to anode 198 is again cut off. This sequence of operation is repeated continuously so long as exciting impulses arrive over the line 159. The counter stage is free running in the absence of input excitation, due to the return of the grids to a positive potential, but this is without significance as in normal operation the clock pulse generator is continuously operated and other portions of the system would fail to function if the clock generator should become inoperative.

From the foregoing considerations, it will be clear that the lead 238 is alternately driven to about 100 volts positive with respect to ground, and to a potential approaching the ground potential, this change in voltage level occurring at periods corresponding to the period of the input excitation. Thus, the frequency observed on the output lead 238 is one-half the frequency of the incoming excitation.

Each time the anode 196 swings positively, a positive impulse is impressed on the control grid of the input valve 244 of the succeeding counter stage "1." Therefore, once for every other period of the clock pulses 180, the counter stage "1" is actuated and impulses developed thereby are delivered to the output lead 248 associated with this stage. A similar output capacitor 252 links the counter stage "1" with counter stage "2" and so on to counter stage "11." Each of these counter stages is similar in its structure to counter stage "F" and operates in substantially the same manner, each stage functioning at one-half its input frequency, so that successive division by a factor of two is attained.

Before leaving the discussion of the counter chain, however, it is well to call attention to the following characteristics of such chains. Assume now that the left hand sides of the dual triode counter valves are conductive and that a positive impulse arrives over the lead 159. The immediate effect of this impulse is the development of a negative impulse applied to the right hand anode of the counter valve 186 to transfer conduction thereto. With the transfer of conduction to the right hand side of the dual triode valve 186 a positive impulse passes through the interstage coupling capacitor 243 to the input valve 244, the resulting negative impulse in its anode circuit initiating the transfer of conduction from the left to the right hand side of the dual triode valve in counter stage "1." Since the second transfer cannot be effected until the first transfer is under way, it is apparent that there is a finite delay time between these successive operations, which might be referred to as the counter carry time. This may be appreciable when dealing with such small intervals of time as must be considered in the instant storage system and a long counter chain.

In the present instance a counter chain including 11 stages in the immediate operating circuit has been found possessed of such a long carry time when all the interstage carries are summed up that it has been found desirable to incorporate an arrangement bringing all the outputs from the various counter stages into more exact synchronism. The output from the "F" stage of the counter chain and stages "1" through "5" thereof, are impressed on the intermediate coupling and delay devices illustrated in Figure 8. The output from stages "6" through "11" is treated as shown in Figure 9. The output from the "F" stage is impressed upon the control grid 262 of the function coupling valve 258 through the isolating capacitor 260. The anode 264 of the function coupling valve 258 is connected through a delay line 266, characterized by a signal delay substantially equal to the sum of the carry times from the "F" stage to stage "10" of the counter chain 77. The cathode 268 of the function coupling valve 258 is connected with a source line 271, while its space charge grid 270 is connected with source line 231, also the point of grid return via resistor 272 is connected between this point and the control grid 262.

The end of the delay line 266 remote from the anode 264 is connected with the supply line 41 through a current limiting resistor 274 and is bridged to the supply bus 195 by oppositely poled diodes 276, 278 connected in series, respectively, with resistors 280 and 282. The poling of the diodes is such that positive going impulses from the output of the valve 258 appear across resistor 282 while similar negative going impulses are developed across the resistor 280. The line is, therefore, always properly terminated, whether delivering positive or negative going impulses. Each of these resistors is substantially equal to the characteristic impedance of the delay line, which may be of conventional structure utilizing a sectionalized winding with a number of loading capacitors in which there is substantial mutual coupling between individual sections, of the order of ten to fifteen percent. The voltages developed across the resistor 280 are impressed on the control grids of the "select" bus driver valves 284 and 286, delivering signals to the respective "select" operating buses 288 and 290. The anode loads of these valves 284 and 286 are made up of compensated inductance-resistance combinations 287, 289 returned to the supply line 195, while the cathodes of these valves are connected with the source line 271. The space charge grids thereof are connected with the supply line 211, which also serves as a point of D.C. reference potential for the control grid circuits by virtue of the connection of one end of grid resistor 292 thereto.

The negative going impulses appearing across the resistor 280 are also impressed on the control grid 296 of the "regenerate" coupling valve 294 through the coupling capacitor 298. The control grid 296 of this valve is returned to the supply line 231 through the grid resistor 299, while its cathode 300 is connected with the supply line 271. The anode 302 of the "regenerate" coupling valve connects with the supply line 195 through the usual compensated anode load comprising resistance and inductance, and the output impulses in the anode circuit of this valve are impressed in parallel on the control grids 304 and 306 of the "regenerate" bus driver valves 308 and 310 whose anodes connect with the supply bus 101 through the usual compensated anode load. Output signals driving the "regenerate" buses, relating to horizontal and vertical deflection, respectively, are delivered through the lines 312 and 314. It will be noted that only a single delay line is utilized in conjunction with the output of the "F" counter stage, since once properly corrected for carryover delay, amplification may take place in straightforward fashion in the valves 294, 308 and 310.

During the "select" portion of the operating cycle, the "F" counter stage delivers a negative signal through the capacitor 260 to the control grid 262 of the function output valve 258, which is reversed in polarity within the function output valve and delivered to the "select" bus driver valves 284 and 286, after compensatory delay in the delay line 266 introducing a delay substantially equal to the total of the carry times encountered between the "F" stage and stage "10" of the counter chain 77. This positive going impulse delivered to the control grids of the function bus driver valves and limited by the action of diode 276, develops a negative going impulse in the anode circuits of these valves which are applied, respectively, to the horizontal "select" bus 288 and to the vertical "select" bus 290. In addition, the positive going signal developed in the output circuit of the function output valve 258, is impressed on the control grid of the "regenerate" output valve 294, which inverts the polarity of these impulses, applying them as negative going impulses to the control grid of the "regenerate" bus driver valves 308 and 310, which supply signals to the horizontal "regenerate" bus 312 and the vertical "regenerate" bus 314. The connection of these buses, and the balance of the signal carrying leads will be apparent from the discussion of later appearing figures.

It will be observed, therefore, that during the "select" period of the "F" stage negative signals are delivered on the "select" buses, while positive signals are delivered on the "regenerate" buses. With the receipt of the next clock impulse, the "F" stage experiences a shift in the triode conductivity, resulting in the impression on the "select" driver buses of a positive impulse, while a negative impulse is delivered along the "regenerate" buses. There exists no necessity for the introduction of separate delay elements in the "regenerate" portions of the circuit, as they are actuated from the "select" output which has already received the proper compensatory delay for the carry time existing in the counter chain 77.

As the counter chain 77 operates in response to the impressed clock impulses, positive and negative impulses are applied to the counter or divider output valves 316, 342, 344, 346 and 348, each of which develops in its anode circuit an impulse of inverted polarity passing through compensating delay lines, one of which, in the anode circuit of the valve 316, is illustrated in detail at 320. The delay provided by the lines 350, 352, 354 and 355 diminishes progressively by an amount equal in each instance to the carry time between the stage concerned and the immediately preceding stage in the counter chain. The leads 332, 334, 336, 338 and 340, therefore, deliver to the apparatus which they serve, impulses with coincident leading edges.

The stages associated with the horizontal selecting and deflecting circuits are illustrated in Figure 9, and comprise a number of divider output coupling valves 356, 358, 360, 362 and 364, each of which, save the valve 364, may have situated in its anode circuit a delay line 366, 368, 370, 372, similar in structure and purpose to the delay line 320 illustrated in the anode circuit of the valve 316 in Figure 8. The omission of the delay line in the anode circuit of the valve 364 arises from the fact that the output of this valve is used as a time reference, and all other delay lines are proportioned to bring the leading edges of the impulses delivered to the output lines 376, 378, 380 and 382 into time synchronism with the timed impulses appearing on the line 384.

An additional output stage actuated from stage "11" of the counter chain 77 is illustrated in Figure 9. This is the supervisory pattern cycling stage which is under the control of the switch 88. It includes the valve 386 whose control grid 388 is excited through the capacitor 390 from stage "11" of the counter chain 77. The anode 392 of the valve 386 is connected with ground through the compensated anode load 394, while its space charge grid 396 is connected with the supply lead 71. The pattern transfer switch 88 is of the single pole, double throw type, with its movable contact connected to the lead 398 controlling beam enlargement, one fixed contact 814 to the anode 392 and the other fixed contact 810 to the focus control unit. With the movable contact of the switch 88 in engagement with fixed contact 814 overriding control of the action of the beam enlarging circuits is provided. A positive impulse from the output of stage "11" results in the delivery of a negative impulse to the beam control line, while a negatively poled impulse from the output of stage "11" results in a positive impulse on the beam control line 398. The action of such impulses on the operating circuits of the storage system will be apparent from the detailed later consideration of the beam control circuits.

The horizontal storage area selector and beam deflection circuits are illustrated in Figure 10. In brief, the sweep voltage generator develops the desired incremental voltage changes by drawing predetermined currents from selected taps in a resistor network. The network referred to, includes the series connected resistors 390, 392, 394, 396 and 398. One end of this resistor string is connected with the supply lead 200, and the five other points thereon are individually connected through constant current load devices proportioned, in conjunction with the resistance values, to deliver the desired voltage increments. For the purpose of illustration, each of the constant load devices chosen draws substantially the same current, the resistors having progressively increasing impedances. For example, expressed in units, a table of the relative nominal resistance values with constant currents drawn from the taps earlier referred to, might be as follows:

TABLE I

| Resistor: | Relative resistance |
|---|---|
| 390 | 1 |
| 392 | 1 |
| 394 | 2 |
| 396 | 4 |
| 398 | 8 |

For reasons to be discussed later these relationships are not rigidly adhered to in practice but may, with profit, be selected according to a somewhat modified rule.

The junction of resistors 390 and 392 is connected through a resistor 400 with the anode 402 of the load valve 404. The cathode 406 of the valve 404 is connected through resistor 408, shunted by by-pass capacitor 410, resistor 412 and adjustable resistor 414 with the source lead 101. The control grid 416 of the load valve 404 may be connected with the anode 418 of a regulator valve 420 and the anode 422 of a control valve 424. The anode 418 of the regulator valve 420 is connected with the supply line 86 through the familiar compensated anode load 426 and its cathode 428 is linked with the source line 25. The space charge grid 430 of the regulator valve 420 is connected with the supply line 96, and its control grid 432 is linked with the junction of the resistors 408 and 412 in the cathode circuit of the load valve 404.

The foregoing, as will be later described, constitutes a substantially constant current load, effectively connected and disconnected under the influence of the control or switching valve 424. This latter valve has a cathode 434 connected with the supply line 203 and a space charge grid 436 excited from the supply line 141. Its control grid 438 is connected with the supply line 201 through the compensated load 440 and to the junction of the anodes of a pair of unilateral conductors, or germanium crystal diodes, 442 and 444. The cathode of the diode 442 is connected with the movable contact 446 of one of the selector switches comprising the selector switch bank 69. The stationary contact 447 of the switch 446 is linked with the "select" driving line 288. In addition, the selector switch 446 is provided with an additional free fixed contact 448 and with a fixed contact 449 connected with the source line 271.

The cathode of the diode 444 is linked through resistor 454 with a supply line 301, and in addition, is connected with the cathodes of an additional pair of diodes 450 and 452. The anode of diode 450 is connected with the "regenerate" driver bus 312, while the anode of the diode 452 is linked with a signal on the line 332 controlled by the counter stage "1." The delay line 320, between the counter coupling valve 316 and the line 332 is terminated in a resistor 322 returned to minus 195 volts. The load valves 456, 458, 460 and 462 are similarly connected through resistors 457, 459, 461, which are so selected that each load valve looks into substantially the same impedance, and a direct connection with the low potential end of resistors 392, 394, 396 and 398, respectively. The selector switches 463, 464, 466 and 468 are utilized for control purposes, governing current flow through their associated load valves in a manner which is identical to that of the first earlier mentioned stage.

The operation of the constant current network drawing current through the resistor 400 is based on the degenerative coupling action between the cathode circuit of the valve 404 and its control grid 416 through the regulator valve 420. The operation of this constant current network is governed by the control valve 424, whose anode 422 is connected with the junction between the control grid 416 of the load valve 404 and the anode 418 of the regulator valve 420. The cathode 434 of the control valve 424 is returned to minus 202 volts, while the cathode of the load valve 404 is returned to minus 100 volts through the resistors previously mentioned. Since the anode 418 and control grid 416 are connected with plus 85 volts through an impedance 426 including a resistor which may have a value of 5000 ohms when the control valve 424 is conductive, drawing an anode current of perhaps 50 milliamperes, the voltage on the grid 416 is changed to a value cutting off the flow of current through the load valve 404. Conversely, when the flow of anode current through the control valve 424 is interrupted, the control grid 416 is left free to assume the normal operating voltages obtaining when the circuit is functioning as a constant current load. The manner in which this control action is exercised will be the subject of a later detailed discussion. In this discussion it will be helpful to recollect the following typical, though not necessarily unique values for the indicated circuit element:

TABLE II

| | |
|---|---|
| Resistor **289** | 3,700 ohms. |
| Resistor **313** | 3,700 ohms. |
| Resistor **322** | 1,800 ohms. |
| Resistor **440** | 5,600 ohms. |
| Resistor **454** | 22,000 ohms. |
| Valve **284** | Commercial Type 50B5. |
| Valve **308** | Commercial Type 50B5. |
| Valve **404** | Commercial Type 6J6. |
| Valve **420** | Commercial Type 6AK5. |
| Valve **424** | Commercial Type 50B5. |

Let it be considered that, normally the load valve 404 is in the non-conductive state and that the control circuits operate to establish the flow of current through this and its companion valves in a predetermined sequence.

During the "select" portion of the operating cycle, the valve 284 is conductive, while the valve 308 is essentially non-conductive. Assume further that the movable contact on selector switch 446 is in its central, or open position to effectively remove the diode 442 from the circuit. The valve 316 may be assumed either conductive or non-conductive as will be apparent. Let us say first, however, that it is non-conductive. It is found that a current flows from minus 100 volts through resistor 313, diode 450 and resistor 454 to minus 300 volts. Such flow of current alone would bring the diode end of resistor 454 to a potential in the neighborhood of minus 185 volts, that is, positive with respect to the minus 200 volts of supply lead 201 serving as the grid return for the control valve 424. The presence of the diode 452 and resistor 322 returned to minus 195 volts prevents this potential from shifting to a value any more negative than minus 195 volts, so that the diode end of the resistor 454 must at all times, under the assumed conditions, exhibit a potential positive with respect to the minus 200 volt supply line 201, whereby the diode 444 effectively presents an open circuit, permitting the control grid 438 to assume a quiescent potential 2 volts negative with respect to its associated cathode, permitting conduction through the control valve 424, maintaining the control grid 416 of the load valve 404 strongly negative with respect to its associated cathode, which prevents the flow of current therethrough.

If it be now assumed that the valve 316 is conductive during the "select" portion of the function cycle and during the continuation of non-conduction through the valve 308, while the selector switch 446 is in its central or open position, it is seen that the diode end of the resistor 322 becomes more negative, approaching minus 250 volts. This negative potential effectively open circuits the diode 452 permitting the diode end of the resistor 454 to assume a potential of minus 185 volts which is again, as before, positive with respect to the minus 200 volts on supply lead 201. This set of relative potentials is in opposition to the conductive direction of the diode 444, which thus presents an open circuit, so that the control grid 438 is again connected effectively with the supply line 201, the bias so produced permitting the continuation of current flow through the control valve 424. Thus, during the "select" portion of the function cycle, while the selector switch 446 is in its central, or open position, current flow cannot be established through the load valve 404, nor through the anode circuits of any of its companion load valves 456, 458, 460 or 462 so long as their associated selector switches 463, 464, 466 and 468 are in the central, or open position.

The conditions obtaining when the movable contact 446 of the first selector switch is in engagement with fixed contact 447, effectively connect one terminal of the diode 442 with the anode of the driver valve 284 are next considered. During the "select" portion of the function cycle this valve, as has been noted previously, is in the conductive state and its anode, accordingly, assumes a potential of the order of minus 250 volts. This, it will be noted, is negative with respect to the potential of supply line 201, and accordingly, the diode 442 conducts, to place a strong negative potential on the control grid 438 of the control valve 424 which is thereupon cutoff to permit the flow of current through the load valve 404. This current produces a voltage drop across the resistors 412 and 414 in its cathode circuit, which is impressed on the control grid 432 of the regulator valve 420. Increasing current flow through the resistors 412 and 414 changes the voltage applied to the control grid 432 in the positive sense, to increase the anode current flowing through the load impedance 426, thereby reducing the positive potential developed at the control grid 416 of load valve 404. The value of the current flowing in this portion of the circuit when equilibrium has been established is controlled by the adjustment of the variable resistor 414.

Again considering the "select" portion of the function cycle, and assuming that the movable contact 446 of the first selector switch in the bank 69 is connected with fixed contact 449, it is apparent that the minus 270 volt potential on the supply line 271 which is considerably negative with respect to the minus 200 volt potential on the supply line 201 produces conduction through the diode 442 to impress on the control grid 438 of the control valve 424 a strong negative potential, cutting it off and permitting the flow of current through the associated load valve 404. This action occurs whether the "select" driver valve 284 is conductive or non-conductive and, in fact, overrides all other signal inputs, including those from the "regenerate" driver valve 308 or the counter coupling valve 316.

During the "regenerate" portion of the function cycle the flow of current through the load valve 404 is independent of the setting of the selector switch 446 except when the movable contact is in engagement with fixed contact 449. This is because the valve 284 is non-conductive, whereby a potential of polarity opposing the conductive direction of the diode 442 is present across the diode 442, so that it effectively presents an open circuit so long as the movable contact 446 is in engagement with the fixed contact 447. During the "regenerate" portion of the function cycle, the valve 308 is conductive, bringing its anode and the line 312 to a potential of approximately minus 250 volts. This, it will be noted, impresses a potential across the diode 450 which has a sense opposite to the conductive direction of the diode, and therefore this element effectively presents an open circuit. So long as the counter coupling valve 316 remains non-conductive, conduction through the diode 452 will continue, to establish at the diode end of the resistor 454 a potential of approximately minus 200 volts, which prevents the control grid 438 from becoming sufficiently negative to cut-off the flow of current through the control valve 424, whereby the load valve 404 remains in the non-conductive state. When the counter drives the counter coupling valve 316 into the conductive region, the diode end of the load resistor 322 assumes, after a time delay proportioned as earlier described, a potential of approximately minus 250 volts, resulting in the development of a potential across the diode 452 acting in the reverse direction, so that this element effectively presents an open circuit under these conditions. Current now flows from the minus 200 volt supply bus 201 through the grid impedance 440, diode 444 and the resistor 454 to the minus 300 volt lead 301. This places a potential of approximately minus 220 volts on the control grid 438 of the control valve 424 to cut off the flow of current therethrough and release the control grid 416 of the load valve 404 so that a load current of predetermined magnitude is drawn. The regulator valve 420 now cooperates with the load valve 404 in the manner previously described to maintain such load current senelectrostatic deflection type cathode ray tube are brought out directly from the anode 482, and from the cathode 470 through the bucking battery 478. The potential of the battery 478 may be selected to be substantially equal to the working anode potential of the valve 472.

During the continuing operation of the apparatus, therefore, voltages controlled by the setting of the switches in the bank 69 are delivered during successive "select" portions of the function cycle, while progressively varying sweep voltages controlled by successive actuation of the counter stages are applied to the deflecting electrodes of the cathode ray tube during the "regenerate" portion of the function cycle.

The resistors 400, 457, 459 anad 461 connected in the anode circuits of the respective load valves 404, 456, 458 and 460 serve to equalize the anode circuit impedances present in the anode circuits of the load valves. The load valve 462 is without such a series anode resistance as it has in its anode circuit the highest load resistor 398, and all other anode load resistances are so proportioned as to make each valve work into approximately the load impedance viewed by the load valve 462. Assuming that the load currents drawn by the various load valves are substantially equal and that the tapped sweep voltage generating resistance, including resistances 390, 392, 394, 396 and 398 have the values set forth in Table I, the following relative sweep voltages are generated in the indicated sequence during successive "regenerate" periods of the function cycle:

TABLE III

| Regeneration Cycle | Counter Stage "1" | | Counter Stage "2" | | Counter Stage "3" | | Counter Stage "4" | | Counter Stage "5" | | Current through— | | | | | E |
|---|---|---|---|---|---|---|---|---|---|---|---|---|---|---|---|---|
| | | | | | | | | | | | R390 1 | R392 1 | R394 2 | R396 4 | R398 8 | |
| 0 | ------ | x | ------ | x | ------ | x | ------ | x | ------ | x | 0 | 0 | 0 | 0 | 0 | 0 |
| 1 | x | ------ | ------ | x | ------ | x | ------ | x | ------ | x | 1 | 0 | 0 | 0 | 0 | 1 |
| 2 | ------ | x | x | ------ | ------ | x | ------ | x | ------ | x | 1 | 1 | 0 | 0 | 0 | 2 |
| 3 | x | ------ | x | ------ | ------ | x | ------ | x | ------ | x | 2 | 1 | 0 | 0 | 0 | 3 |
| 4 | ------ | x | ------ | x | x | ------ | ------ | x | ------ | x | 1 | 1 | 1 | 0 | 0 | 4 |
| 5 | x | ------ | ------ | x | x | ------ | ------ | x | ------ | x | 2 | 1 | 1 | 0 | 0 | 5 |
| 6 | ------ | x | x | ------ | x | ------ | ------ | x | ------ | x | 2 | 2 | 1 | 0 | 0 | 6 |
| 7 | x | ------ | x | ------ | x | ------ | ------ | x | ------ | x | 3 | 2 | 1 | 0 | 0 | 7 |
| 8 | ------ | x | ------ | x | ------ | x | x | ------ | ------ | x | 1 | 1 | 1 | 1 | 0 | 8 |
| 9 | x | ------ | ------ | x | ------ | x | x | ------ | ------ | x | 2 | 1 | 1 | 1 | 0 | 9 |
| 10 | ------ | x | x | ------ | ------ | x | x | ------ | ------ | x | 2 | 2 | 1 | 1 | 0 | 10 |
| 11 | x | ------ | x | ------ | ------ | x | x | ------ | ------ | x | 3 | 2 | 1 | 1 | 0 | 11 |
| 12 | ------ | x | ------ | x | x | ------ | x | ------ | ------ | x | 2 | 2 | 2 | 1 | 0 | 12 |
| 13 | x | ------ | ------ | x | x | ------ | x | ------ | ------ | x | 3 | 2 | 2 | 1 | 0 | 13 |
| 14 | ------ | x | x | ------ | x | ------ | x | ------ | ------ | x | 3 | 3 | 2 | 1 | 0 | 14 |
| 15 | x | ------ | x | ------ | x | ------ | x | ------ | ------ | x | 4 | 3 | 2 | 1 | 0 | 15 |
| 16 | ------ | x | ------ | x | ------ | x | ------ | x | x | ------ | 1 | 1 | 1 | 1 | 1 | 16 |
| 17 | x | ------ | ------ | x | ------ | x | ------ | x | x | ------ | 2 | 1 | 1 | 1 | 1 | 17 |
| 18 | ------ | x | x | ------ | ------ | x | ------ | x | x | ------ | 2 | 2 | 1 | 1 | 1 | 18 |
| 19 | x | ------ | x | ------ | ------ | x | ------ | x | x | ------ | 3 | 2 | 1 | 1 | 1 | 19 |
| 20 | ------ | x | ------ | x | x | ------ | ------ | x | x | ------ | 2 | 2 | 2 | 1 | 1 | 20 |
| 21 | x | ------ | ------ | x | x | ------ | ------ | x | x | ------ | 3 | 2 | 2 | 1 | 1 | 21 |
| 22 | ------ | x | x | ------ | x | ------ | ------ | x | x | ------ | 3 | 3 | 2 | 1 | 1 | 22 |
| 23 | x | ------ | x | ------ | x | ------ | ------ | x | x | ------ | 4 | 3 | 2 | 1 | 1 | 23 |
| 24 | ------ | x | ------ | x | ------ | x | x | ------ | x | ------ | 2 | 2 | 2 | 2 | 1 | 24 |
| 25 | x | ------ | ------ | x | ------ | x | x | ------ | x | ------ | 3 | 2 | 2 | 2 | 1 | 25 |
| 26 | ------ | x | x | ------ | ------ | x | x | ------ | x | ------ | 3 | 3 | 2 | 2 | 1 | 26 |
| 27 | x | ------ | x | ------ | ------ | x | x | ------ | x | ------ | 4 | 3 | 2 | 2 | 1 | 27 |
| 28 | ------ | x | ------ | x | x | ------ | x | ------ | x | ------ | 3 | 3 | 3 | 2 | 1 | 28 |
| 29 | x | ------ | ------ | x | x | ------ | x | ------ | x | ------ | 4 | 3 | 3 | 2 | 1 | 29 |
| 30 | ------ | x | x | ------ | x | ------ | x | ------ | x | ------ | 4 | 4 | 3 | 2 | 1 | 30 |
| 31 | x | ------ | x | ------ | x | ------ | x | ------ | x | ------ | 5 | 4 | 3 | 2 | 1 | 31 |
| 0 | ------ | x | ------ | x | ------ | x | ------ | x | ------ | x | 0 | 0 | 0 | 0 | 0 | 0 |

sibly constant. Therefore, except when the selector switch governing the operation of a particular load valve is connected with the minus 270 volt supply line 271, effectively removing such valve from participation in the operation of the combination, the sequential excitation of the counter coupling valves establishes and discontinues currents from the various branch points on the composite load resistance 390—398 to provide incremental voltage changes which are impressed on the control grid 470 of the horizontal deflection amplifier 472 connected with the anode end of the end load resistor 398. The valve 472 includes, as well, an anode 482 connected with the supply line 500 through a load impedance 474 and a cathode 480 connected with the supply line 50 through a load impedance 476. Connections to the deflection plates of the Considering this table, and the action of the selector switches comprising the switch bank 69, it is apparent that whenever the movable contact of a given selector switch is located in the "off" or minus 270 volt position, the voltage and current increments produced by its associated load, regulator and control valves are eliminated from the repetitive pattern of operations of the electric storage system. For example, if the switch 46 is in the "off" position, voltage and current increments arising from the operation of the counter stage "1" are eliminated. Accordingly, considering only a single horizontal line, during the first "regenerate" cycle the "1" area is bombarded. Thereafter, during the "regenerate" portion of the second function cycle the "1" area is again bombarded. During the "regenerate" portion of the third function cycle the storage area "3" is bombarded, etc. in the following manner; "1," "1," "3," "3," "5," "5," "7," "7," "9," "9," . . . "31," "31." Therefore, the closure of this switch permits a reduction of the density with which storage areas are present on the screen 12 of the cathode ray tube 56.

With the switch 463 in the "off" position, the storage areas on a single line are traversed in the following manner: "2," "3," "2," "3," "6," "7," "6," "7," "10," "11," "10," "11," . . . "30," "31." The pattern laid down in this instance is characterized by the presence of rather wide lanes or alleys therein. With both the switches 446 and 463 in the "off" position, the area bombardment sequence is: "3," "3," "3," "3," "7," "7," "7," "7," "11," "11," "11," "11," . . . "31." This would represent, if the same resolution were present in the vertical direction, a very material reduction in storage density on the face of the cathode ray tube, which may be convenient for certain test purposes when the ultimate resolution is being experimentally investigated. The various patterns which may be obtained, may be readily derived by application of the above considerations.

While, in the foregoing, it has been assumed that the resistors comprising the load impedance across which the sweep voltage is generated are related one to the other, in the manner shown in Table I, while the currents drawn from the various tapped points are substantially equal, it is immediately apparent that the desired "jump" or step sweep voltages could be developed with other relationships between the various resistors if the load currents drawn from the tapped points are adjusted or selected accordingly.

In addition, it has been found that the range of random variations of the step sweep voltage from their nominal value is a function of the magnitude of the sweep voltage itself, and that, accordingly, the maximum reliable resolution on the storage screen of the cathode ray tube is derived if the resistors 390, 392, 394, 396 and 398 are related in something other than integral multiples of the smallest thereof. An example of such a relationship appears in the following table:

TABLE IV

| Resistor | Ohmic Values, ohms | Relative Values |
|---|---|---|
| 390 | 373.75 | 1 |
| 392 | 381.88 | 1.025 |
| 394 | 780 | 2.09 |
| 396 | 1,592.5 | 4.26 |
| 398 | 3,250 | 8.71 |

These values, again assuming substantially equal load currents drawn from the tapped points on the composite sweep load resistor, provide a progressively increasing separation between those areas in the charged pattern which are most likely to interfere with one another, but afford within the various blocks, storage at the maximum density of which the cathode ray tube is capable. Again, it is clear that the same separation between sequentially traversed incremental sweep voltages can be obtained, using resistance values other than those listed as specific examples, if the load currents drawn from the tapped points are adjusted to produce the same incremental voltage changes.

The circuits for generating incremental vertical beam positioning voltages are illustrated in Figure 11, and are substantially identical with those previously described in connection with Figure 10. A composite sweep generator load resistance consisting of the series connected resistors 490, 492, 494, 496, 498 is connected at one end with the supply lead 200 and at the other end with a load valve 519. In addition, a resistor 500 connects the junction of resistors 490 and 492 with the anode 512 of the load valve 510; the resistor 502 connects the junction of resistors 492 and 494 with the anode of load valve 513; the resistor 504 connects the junction of resistors 494 and 496 with the anode of load valve 515 and the resistor 506 connects the junction of resistors 496 and 498 with the anode of the load valve 517. As in the horizontal beam positioning circuits, the control grid 514 of the load valve 510 is connected with the anode 530 of the regulating valve 526 and with the anode 536 of the control valve 538. The cathode 516 of the valve 510 is connected with the supply bus 101 through resistors 518, 520 and adjustable resistor 522. In addition the resistor 518 may be by-passed by a small capacitance of the order of 10 to 50 mmfd. to improve the circuit stability. The junction of resistors 518 and 520 is connected with the control grid 524 of regulator valve 526, whose space charge grid 532 is also connected with a supply line 96. The cathode 534 of the regulator valve 526 is linked with the power supply lead 25. The control valve 538 has a space charge grid 544 connected with the supply line 141, a cathode 540 connected with the supply line 203 and a control grid 542 connected through the load impedance 546 with the supply line 201. In addition, the control grid 542 is connected with one side of the diodes 548 and 550, poled as indicated in the drawing. The remaining side of the diode 548 is connected with the movable contact member of the selector switch 560 which, with its companions 562, 564, 566 and 568, provide the vertical selector control portion of the switch bank 69, referred to in the block diagram of Figure 5.

In addition, the switch 560 is provided with a fixed contact 571 connected with the cathode of the vertical "select" driver valve 286 via the line 290. It will be noted that the anode of the "select" driver valve 286 is connected as well with minus 195 volts through the load impedance 287. The central contact 572 of the selector switch 560 is free. The remaining contact 575 of the selector switch 560 is linked with the minus 270 volt supply line 271. As will be noted from the drawing, the remainder of the selector switches comprising this portion of the switch bank, are similarly connected.

The side of the diode 550 which is remote from the control grid 542 is connected with a minus 300 volt source on the line 301 through the resistor 574 to the anode of the "regenerate" driver valve 310 through diode 570 and to the counter coupling output line 376 through the diode 573. All diodes are poled as shown with the arrow indicating the direction of maximum conductivity. The "regenerate" driver valve 310, which has its anode returned to minus 100 volts through the load impedance 311, in addition to exciting the diode 570, also excites similar diodes in similar networks through the lead 314. In addition, the balance of the counter coupling stages are connected with selector network diodes through the leads 378, 380, 382 and 384 extending to the stage outputs of Figure 9.

The line 578 connects the signal end of the composite sweep circuit load resistor with the control grid 580 of the sweep amplifier valve 582. This valve includes an anode 584 connected with the 500 volt supply line 500 through the load impedance 576, and a cathode 586 connected with the supply line 50 through an impedance 588. A direct current source 590 serves to oppose the operating anode drop across the valve 582, so that the relative potentials applied to the vertical deflection plates are such that the beam remains substantially centered on the screen of the cathode ray tube 56. This circuit operates in substantially the same manner as the circuits already described in connection with Figure 10.

The control valve 538 may be regarded as normally conductive, whereby a strong negative potential is impressed upon the control grid 514 of the load valve 510, preventing the flow of anode current therethrough. When the control grid 542 of the control valve 538 is driven negative, control valve 538 is cut-off, freeing the control grid 514 of the load valve 510 from its clamping action and permitting anode current to flow therethrough, its magnitude being controlled by the adjustment of resistor 522 in the cathode circuit of the load valve 510, acting in conjunction with the regulator valve 526. As before, an increase in the current flowing in the cathode 516 is reflected as an increase in the positive voltage applied to the control grid 524, which increases the anode current through the load impedance 528, to shift the potential of the control grid 514 negatively, thereby counteracting the tendency of the original anode current of the valve 510 to increase. The exact value of current at which stabilization occurs is determined by the setting of the variable resistor 522.

During the "select" portion of the function cycle, the "select" driver valve 286 conducts, bringing its anode potential to a value of the order of minus 250 volts, which is strongly negative with respect to the minus 202 volt potential of the cathode 540 of the control valve 538. When the movable contact of the selector switch 560 is in engagement with the fixed contact 571, this negative voltage excursion causes conduction in the diode 548, with resultant impression of a strong negative bias on the control grid 542 of the valve 538 to cut-off the flow of current through same, during the continuation of the "select" portion of the function cycle.

With the movable contact of the selector switch 560 in engagement with the "off" contact 572, the control valve 538 remains conductive during the entire "select" portion of the function cycle. This is because the valve 310 is non-conductive, whereby polarities are created which establish conduction through the diode 570 and resistor 574, bringing the diode end of the resistor 574 to a potential such that the diode 550 is effectively open circuited. Despite the periodic conduction of the counter coupling valves which produce potential changes on the lines 376, 378, 380, 382 and 384 during the "select" portion of the function cycle, the potentials applied to the diode 550, and its fellows, cannot produce counterpart impulses applied to the control grid of the control valves so long as the "regenerate" driver valve 310 remains non-conductive.

With the movable contact of the selector switch 560 in engagement with the fixed contact 575, which is maintained at a potential of minus 270 volts, a continuous negative bias of cut-off magnitude is applied to the control grid 542, thereby permitting the flow of current through the load valve 510 at all times, whether the function cycle is passing through the "select" or "regenerate" phase.

Operation during the "regenerate" portion of the function cycle is independent of the selector switch positions, so long as their movable contacts are not in engagement with the fixed contacts linked to the minus 270 volt supply line 271. During this portion of the function cycle, the valve 310 is conductive, while the "select" driver valve 286 is non-conductive. The anode of the valve 310 now tends to assume a strongly negative potential of the order of minus 250 volts, but, until the valve associated with the line 376 also conducts, the flow of current along the line 376 and its associated components, through the diode 573 and resistor 574 prevents the diode end of the resistor 574 from becoming sufficiently negative to initiate conduction through the diode 550. With the establishment of an anode current pulse in the valve associated with the line 376, the potentials are so altered that the diode 573, as well as diode 570, effectively presents an open circuit and current flow takes place through the grid impedance 546, the diode 550 and the resistor 574 to establish a potential of the order of minus 220 volts on the control grid 542. This is sufficiently negative with respect to the cathode 540 to cut off the flow of anode current through the control valve 538 and permit the flow of load current in load valve 510, to produce the desired incremental voltage, shifting the beam to the point now subject to the periodic regeneration process.

Similar actions occur periodically in the switching, diode, and control circuits associated with the load valves 513, 515, 517 and 519, the exact patterns being established by the settings of the selector switches 562, 564, 566 and 568. With the components selected and proportioned in the manner previously described, equal incremental voltage changes may be developed for vertically positioning the cathode ray beam, or, if preferred, unequal incremental changes may be produced for this purpose with the advantages earlier described. The voltage changes are applied across the sweep load resistor, via the lead 578, to control grid 580 of the sweep voltage amplifier valve 582, which produces sweep voltages of relatively inverted polarities at its anode and cathode, respectively, to drive the electron beam within the cathode ray tube in the desired manner.

The sweep amplifier valves 472 and 582 are connected with the deflection plate sets 60 and 61 of the cathode ray tube 56 in the manner illustrated in Figure 12. Exciting voltages for the electron gun assembly are derived from a 3000 volt power supply which may have its positive terminal grounded and its negative terminal connected with the lead 3001. A voltage divider including in series fixed resistor 600, focus control potentiometer 602, fixed resistor 604 and intensity control potentiometer 606 are connected between the supply line 3001 and ground, in the manner shown. The movable tap connectors of the respective potentiometers may be by-passed to ground through capacitors 608 and 612, as is the cathode 62 of the cathode ray tube 56, which is connected to the junction between resistors 604 and 606. The beam intensity control electrode 64 of the cathode ray tube 56 is connected with the movable contact of the intensity control potentiometer 606 through a resistor 614 shunted by a D.C. reinserting diode 616. In addition, the electrode 64 is linked, via capacitor 618, with the anode 620 of the intensity driver valve 622. In addition, the anode of this valve is connected through the compensated load impedance 624 with the 200 volt supply line 200.

The focusing electrode 66 is connected with the movable tap on the focus potentiometer 602 through a resistor 626 shunted by the diode 628 poled in a manner preventing the impression of negative surge voltages on the focusing electrode 66. The focus control voltages are impressed on the focus control electrode 66 through the capacitor 630 from the line 632 which is excited from other apparatus shown in detail in Figure 13. Voltage for the second anode 67 is derived from the movable tap on the astigmatism correction potentiometer 174 having its ends connected to plus 250 volts and plus 500 volts. Proper adjustment of the setting of this potentiometer minimizes beam deformation due to astigmatic error in the cathode ray tube 56. The final accelerating electrode 14 may be connected to ground as shown.

The signal electrode 20, earlier referred to, is capacitively associated with the bombarded end wall of the cathode ray tube 56 and connected through the signal lead 24 with a compensated load impedance 22, connected at its signal end with the control grid 634 of the first signal amplifier valve 636. The other end of the compensated impedance 22 is grounded for high frequency currents by the capacitor 638 and supplied with bias voltage through the AGC coupling resistor 640. The anode circuit of the first signal amplifier valve 636 includes a compensated load 642 and the voltage developed thereacross is applied through coupling capacitor 644 to the control grid 646 of the second signal amplifier valve 648. This valve in turn is provided with an anode load impedance 650 across which there is developed a signal delivered to the control grid 652 of the third signal amplifier valve 654 through the coupling capacitor 656. The output of the third signal amplifier stage appears across the compensated load impedance 658 and is impressed on the control grid 660 of the fourth signal amplifier valve 662 through the coupling capacitor 664. Inasmuch as the signal amplifier so far described includes an even number of stages, the signal developed across the compensated impedance 666 in the anode circuit of the fourth signal amplifier valve 662 has the same polarity as the input signal.

The four cascade connected signal amplifiers referred to above may utilize any suitable conventional configurations for the application of power and automatic gain control voltages therethrough as illustrated in the figure. Space charge grid and anode supply voltages may be derived from the plus 150 volt line 150 for the first three amplifier stages while the anode power for the fourth stage is supplied by the positive supply bus 250, the space charge grid supply for this stage being obtained from the supply line 100. The grid bias line includes series connected resistors 640, 668, 670 and 672 to whose junctions are connected the grid resistors 674, 676 and 678, each of these junctions being grounded for high frequency currents by the capacitors 680, 682 and 684, respectively. The free end of the automatic gain control bus resistor 672 is connected with the movable contact of a single-pole double-throw switch 686, which, when thrown to the upper position provides for automatic regulation of the gain of the cascaded amplifiers and, when in its lower position, permits manual gain control independently of the amplitude of the signals present in the signal channel.

The lower fixed contact of the gain control switch 686 is connected with the movable tap on a potentiometer 687, connected in series with the fixed resistor 688 between the supply line 11 and ground. With the movable contact in engagement with this fixed contact, manual positioning of the tap of the potentiometer 687 permits regulation of the grid bias applied to the amplifiers constituting the amplifier train and convenient regulation of the gain thereof. The anode 690 of the fourth signal amplifier valve 662 connects through the capacitor 692 with the diode 694 whose other terminal is returned to a minimum grid bias source, which may have a potential of minus 1 volt, through a resistor 695. The junction between the diode 694 and the resistor 695 is connected with the upper contact of the gain control switch 686, while the junction between the capacitor 692 and the diode 694 may be returned through a resistor 696 to a positive potential of the order of thirty volts.

The poling of the diode 694 is such, that when a negative pulse of sufficient amplitude appears at the anode 690 of the valve 662, the diode 694 conducts to charge the capacitor 697 and apply a negative voltage to the automatic gain control bus. Increasing signals result in the development of increasing automatic gain control voltages and thereby regulate the output amplitude from the signal amplifier valve 662 to the desired level. For this action to occur, the signals delivered from the anode 690 must exceed the delay potential to which the resistor 696 is returned. Voltages less than this will not initiate conduction through the diode 694, whence only the minimum bias applied through the resistor 695 reaches the control grids of the amplifier valves. The appearance of a positive impulse at the anode 690 of the fourth amplier valve 662 is without effect, as such polarity is in opposition to the maximum conductivity of the diode 694 and produces no appreciable voltage change at the input to the automatic gain control line.

The use of an even number of stages between the signal electrode 20 and the point of take-off of the automatic gain control voltage provides a system in which the gain is controlled by the amplitude of the negative going input impulses. This is especially desirable, since negative going impulses will always appear at some time during the operating cycle, even when all "0"s or all "1"s are present in the memory locations. Referring back to Figures 2*a*, 3*a* and 4, corresponding respectively to: reading a "1"; restoring a "1"; and reading a "0," it is apparent that when the memory is filled with "1"s, although positive impulses result from reading the contents of each memory location, negative going impulses are developed during the re-insertion of the "1" in the memory location, and these will serve to energize the automatic gain control circuits. Only negative going impulses, as in Figure 4, are developed when the memory is completely filled with "0"s, so that the maintenance of automatic gain control is also insured in this instance.

In addition, the anode 690 of the fourth amplifier valve 662 is connected through a capacitor 700, diode 702 and resistor 704 with the supply line 100. The junction of the capacitor 700 and the diode 702 is additionally connected through a high frequency isolating choke 706 with the movable tap of a clipping level adjusting potentiometer 708. The movable tap may be grounded for high-frequency currents by capacitor 710, and the two ends of the potentiometer connected, respectively, with minus 40 and plus 35 volts. The junction of the diode 702 and resistor 704 may be further connected through a diode 712 to the timing pulse line 714 which may be regarded as a source of positive going impulses of relatively low impedance. An isolating diode 716 connected between the junction of diode 702 and resistor 714 to the compensated load impedance 718 grounded at its other end, serves to transfer signals exceeding a selected voltage level to the control grid 720 of the signal output valve 722 through the coupling capacitor 724. Grid bias for this valve is obtained by bridging resistors 726 and 728 between potentials of minus 100 volts and minus 130 volts, respectively, and utilizing the voltage at the intermediate junction.

The diodes 702 and 712 are normally conductive and serve as a sampling and timing gate for positive impulses appearing at the anode of the fourth signal amplifier stage 662. In the absence of any signal, and assuming that the clipping level potentiometer 708 is adjusted somewhere near the middle of its range, both diodes 702 and 712 are conductive, current flowing through the respective paths; lead 100, resistor 704, diode 702, inductance 706 to the potentiometer 708; and from line 100 through resistor 704, diode 712 to the timing pulse line 714 which, it will be remembered, presents a relatively low direct current impedance.

Assuming now that a positive going impulse is developed at the anode 690 of the fourth signal amplifier valve 662, there will appear at the diode 702 a voltage of polarity opposing such normally existing conduction, and, if this voltage is sufficiently large, conduction therethrough may cease entirely. This does not release the junction of the two diodes 702 and 712 to assume the potential of the supply line 100, however, for the conduction of the diode 712 continues, since we have assumed that there is then no positive going impulse on the timing pulse line 714. Now the signal developed at the anode 690 of the fourth amplifier valve 662 will, in general, have a duration of the order of 1 microsecond, while the signals on the timing pulse line 714 may have durations of the order of .2 microseconds. Some time after the appearance of the positive impulse at the anode 690, therefore, there appears on the line 714 a relatively narrow positively poled timing impulse which opposes the normally existing conduction through the diode 712, whereby the junction of the diodes 702 and 712 is free to rise to a potential of plus 100 volts or to a positive potential equal to the surge voltage present either on the anode 690 or the timing pulse line 714, whichever is the lesser. Such positively poled impulse produces conduction in the diode 716 to develop a voltage across the load 718 which is impressed on the control grid 720 of the signal output valve 722. By adjusting the position of the tap on the clipping level potentiometer 708, the reference potential on the left hand side of the diode 702 may be controlled, to determine the voltage level at which conduction through the diode 702 ceases. From the above, it is clear, that there is delivered to the control grid 720 a positive impulse whose amplitude may be controlled by the gain of the signal amplifying channel and the setting of the clipping level potentiometer 708, while the time during which the signal sample is extracted is controlled by the width and amplitude of the timing impulse arriving over the line 714.

The signal output valve 722 receiving such sampled and timed signals may be of the space charge grid type, with a grid resistor 728 linking its control grid 720 and its cathode 730 while its anode 732 is connected with ground potential through the compensated load impedance 734. A normally closed single-pole, single-throw signal switch 82 may connect the anode 732 with the signal output line 736 connected to the apparatus of Figure 13.

Reference to this latter figure will be of help in considering the further functioning of the apparatus illustrated in Figure 12. In brief, Figure 13 embraces the focus control unit, the reading control unit and the writing control unit, together with a time sequence selector governing the operation thereof. The operating sequence is determined by the clock pulses arriving over the line 159 from the clock generator of Figure 7 and applied to the input terminals of an electric delay line 738 terminated in its characteristic impedance 740. The clock pulses, it will be recollected, have a duration of the order of .2 microseconds and are separated by about 2.5 microseconds. Accordingly, the delay time of the line 738 may be approximately equal to this period. The delay line 738 may be made up of the conventional mutually coupled series connected inductors with their junctions connected to ground through loading capacitors. The signal appearing at the delay line junction 742 is impressed through capacitor 744 on the control grid 748 of the focus set-up valve 750. This valve is of the space charge grid type with the usual operating potentials applied to its electrodes and its grid returned to minus 70 volts through grid leak resistor 746. The anode 752 may be connected with ground through the compensated load impedance 754 and the cathode 756 can be connected with the supply line 101. In addition, the anode 752 of the focus set-up valve 750 is connected through diode 758 with the anode 760 of the focus flip-flop valve 762. The poling of the diode 758 is such that conduction occurs when the anode 752 is negative with respect to the anode 760, but conduction in the opposite sense does not occur.

The focus flip-flop 765 includes the usual pair of cross-connected valves 762 and 764 whose cathodes 766 and 768 return to the supply line 101 while their space charge grids are connected with the supply line 71. The control grid 770 of the valve 762 is returned through resistor 776 to a potential of minus 130 volts, while the control grid 772 of the valve 764 may be connected with ground through the resistor 778. Thus, the control grid 772 is continuously urged positively with respect to its associated cathode, so that the valve 764 is normally conductive, while the control grid 770 of the valve 762 is normally biased to such an extent as to prevent the flow of current through this valve, which is normally non-conductive. Coupling capacitors connect the anode of one of the flip-flop valves with the grid of the other in each instance, and the anode 760 of the valve 762 is returned to ground through the load impedance 780, the anode 774 of the valve 764 being similarly returned through the load impedance 782. The resistor 784 and capacitor 786 constitute a conventional filtered voltage dropping arrangement.

A resistor 788 is bridged between the anode 760 and the minus 10 volt supply lead 11. In addition, the anode 760 of the valve 762 may be coupled with the control grid 790 of the focus driver valve 792 through the blocking capacitor 794 and peaking coil 796 shunted by resistor 798. The cathode 800 of the focus driver valve 792 may be connected with the supply line 101 and its space charge grid supplied with an adjustable potential from the poteniometer 802 bridged between minus 40 and minus 100 volts. The control grid 790 of the valve 792 may be returned to ground through a grid leak resistor 804, while its anode 806 is similarly connected with ground through the compensated load impedance 808. The line 632 from the focus electrode 66 of the cathode ray tube connects with the movable contact of the automatic cycling switch 88 having a fixed contact 810 connected to the anode 806 of the focus driver valve 792. The other fixed contact 814 may be connected with the anode 392 of the automatic cycling driver valve 386.

While reference has been made, so far, to the focused and defocused conditions of the electron beam within the cathode ray tube 56, it is clear from the explanations which have been made, that the significant difference between these two conditions, so far as the operation of the instant electric storage system is concerned, is the difference in area bombarded on the screen of the cathode ray tube by the two types of beam. For this reason the focus flip-flop 765 might also be properly titled the beam enlarging flip-flop 765, and the action in general referred to as beam enlarging control. The beam enlarging control valve 386 which, in Figure 9, has been illustrated as driven from stage "11" of the cascaded counters, has its anode 392 connected with the defocus line 632 when the cycling switch 88 is in its upper position. With the cycling switch 88 in the lower position, the impulses appearing on the line 632 are derived solely from the focus driver valve 792. Referring briefly to Figure 12, it is observed that the impulses on the line 632 are impressed through the capacitor 630 on the focusing anode 66 of the cathode ray tube 56. During the existence of a positive going impulse on the line 632, the voltage on the focusing anode 66 is increased beyond that required for good focus, resulting in the projection of a defocused beam having a relatively large cross-section at the screen surface of the cathode ray tube 56. After the termination of this impulse, the conditions permitting the projection of a finely focused beam are re-established, negative surges being prevented during the readjustment interval by the diode 628 connected across the resistor 626.

The focus control flip-flop 765 is reset upon the arrival of the clock pulse at the fifth tapped connection 820 on the delay line 738. Voltages appearing here are impressed on the control grid 826 of the flip-flop reset valve 832, this control grid being returned to the supply line 71 through a grid resistor 824. The valve 832 may be of the conventional type utilizing a space charge grid supplied with suitable operating potential and having its cathode 834 returned to the supply line 101. The anode 828 of the valve 832 is connected to ground through the compensated load impedance 830 and is, in addition, connected through the diode 836 with the anode 774 of the normally conductive focus flip-flop valve 764. The anode 774 is, in addition, returned to the minus 10 volt supply line 11 through a resistor 838.

The operation of the focus flip-flop and associated circuits is triggered by the clock impulses on the line 159 in the following manner:

When the positive going clock impulse arrives at the tap 742 on the delay line 738, conduction is initiated in the flip-flop set up valve 750 to produce a negative going impulse at its anode, which initiates conduction through the diode 758, shifting the potential of the anode 760 negatively. This negative shift in voltage is impressed on the control grid 772 of the normally conductive flip-flop valve 764 through the cross-coupling capacitor and diminishes the conductivity through this valve to produce across its anode load 782 a positive going voltage shift coupled to the control grid 770 which accentuates the decrease in anode potential at 760, the action continuing until conduction is established in the valve 762 and interrupted in the valve 764. This results in the impression of a negative going impulse on the control grid 790 of the focus driver valve 792 cutting off or substantially diminishing the flow of anode current therethrough, to develop a positive going impulse across its load impedance 808 which is transferred through the switch 88 in its lower position, to the focus line 632 and thence through the capacitor 630 to the focus control electrode 66 of the cathode ray tube 56, whereupon the conditions for the projection of a defocused beam of electrons are created, it being assumed that the focus potentiometer 602 has been adjusted for the projection of a finely focused beam in the absence of such impulse.

The requirements for the projection of a defocused beam of electrons continue to be satisfied until the clock impulse travelling down the line 738 arrives at the tap 820 and is impressed on the control grid 826 of the focus reset valve 832, in which it permits the flow of an anode current impulse developing a negative going signal across the anode load 830 to cause the flow of current through the diode 836 which shifts the potential of the anode 774 of the normally conductive focus flip-flop valve 764 negatively to reverse the earlier described action and re-establish conduction in the valve 764 while interrupting such conduction in the valve 762. The resulting positive impulse on the control grid 790 of the valve 792 again permits the flow of anode current therethrough, diminishing the potential of the anode 806 and removing the defocus signal from the focus line 632. Thereby the conditions for the projection of a finely focused beam of electrons in the cathode ray tube 56 are re-established.

Set-up of the "read" flip-flop 840, which includes normally non-conductive valve 842 and normally conductive valve 844, is controlled by the signals derived from the tap 846 on the delay line 738. The tap 846 is coupled through the capacitor 848 with the control grid 850 of the "read" set up valve 852 having its cathode 854 connected with the minus 100 volt supply line 101. The space charge grid 856 of the valve 852 is connected with the minus 70 volt supply line to which point the control grid 850 is also returned through the grid resistor 858. The anode 860 of the valve 852 is connected with ground through the compensated load impedance 862 and with the anode 864 of the normally non-conductive "read" flip-flop valve 842, through a normally conductive diode 866, normally non-conductive diode 868 and capacitor 870. The junction of diodes 866 and 868 may be returned to the minus 70 volt supply line 71 through a resistor 872, while the junction between diode 868 and capacitor 870 may be returned to the minus 10 volt supply line 11 through a resistor 874.

The normally non-conductive "read" flip-flop valve 842 has a control grid 876 connected with the anode 878 of the valve 844 through coupling capacitor 880 and with the minus 130 volt supply line 131 through a resistor 882. The control grid 884 of the normally conductive "read" flip-flop valve 844 is returned to ground through the resistor 886 and connected with the anode 864 of the valve 842 through coupling capacitor 888. Each of the valves 842 and 844 includes a cathode returned to the minus 100 volt supply line 101 and space charge grids which are returned to the minus 70 volt supply line 71. The anode 864 is supplied with excitation through the compensated load impedance 890, the anode 878 being similarly supplied through the load impedance 892. The positive ends of these impedances are connected to ground through a resistor 894 shunted by a capacitor 896, whose purpose is the proper adjustment of the operating potentials of the various elements in this and associated portions of the operating circuits. In addition, the intensity buffer lead 900 is connected with the anode 878, leading through inductance 906, shunted by resistor 908, to the control grid 902 of the intensity buffer valve 904 shown in Figure 12.

The junction of diodes 866 and 868 is connected through a further diode 911 with one pole of the normally open single-pole, single-throw "spot" switch 113. The other pole of the "spot" switch 113 is connected through the single-pole, single-throw normally open "no spot and erase" switch 76 to the anode of the "select" bus controlled valve 291, as well as to the minus 70 volt supply line 71 through the resistor 913. The anode 295 of the valve 291 connects with ground through the impedance 293.

The anode 878 of the normally conductive "read" flip-flop valve 844 may be further connected through a capacitor 914 and the diode 917 to the anode 919 of the "read" clear valve 921. The junction of the capacitor 914 and the diode 917 is connected with the minus 10 volt supply line 11 through a resistor 922 to provide the necessary operating bias for the diode 917. The "read" clear valve 921 derives its excitation from the tap 924 on the delay line 738 which is connected with its control grid 926 through the capacitor 928. A resistor 930 connected between the control grid 926 and the minus 70 volt supply line 71 furnishes the grid return. The cathode 932 of the valve 921 is additionally connected with the minus 100 volt supply line 101, while its space charge grid is linked with the minus 70 volt supply line 71. The anode 919 receives excitation through the compensated plate load 934 connected between the anode 919 and ground.

The action of the "read" flip-flop 840 is thus under the control of the set-up valve 852 and the clear valve 921. The strong negative bias impressed on the control grid 876 of the valve 842, maintains this valve normally non-conductive, while the return of the control grid 884 to the relatively positive ground makes the valve 844 normally conductive.

Action in this portion of the system is initiated by the arrival of the positive going clock pulse travelling down the line 738 at the junction point 846, at which point it is transferred through the capacitor 848 to the control grid 850 of the set-up valve 852. This valve is normally non-conductive due to the signal produced bias. Hence, the anode 860 is normally at very nearly ground potential which is positive with respect to the potential of the supply line 71, producing conduction through the circuit including ground, load impedance 862, diode 866, resistor 872, and source lead 71. The relative magnitudes of the load impedance 862 and the resistance 872 are such that the junction of the diodes 866 and 868 is maintained only slightly negative with respect to ground, say 8–10 volts. A voltage in the reverse direction is, therefore, impressed across the diode 868 through the resistors 872 and 874. With the arrival of the positive impulse at the control grid 850 of the set-up valve 852, a surge of anode current flows, dropping the potential of the anode 860 well below ground, so that the current flow through the diode 866 is sufficiently diminished or, perhaps, interrupted, to permit the diode end of the resistor 872 to become sufficiently negative to permit conduction through the diode 868, resulting in the transmission of a negative going surge to the anode 864 of the "read" flip-flop valve 842. This surge is coupled by the capacitor 888 to the control grid 884 of the normally conductive flip-flop valve to diminish the flow of current therethrough, delivering a positive going voltage surge at the control grid 876 of the normally non-conductive "read" flip-flop valve 842, which process continues cumulatively until conduction has been effectively transferred to the valve 842 and cut off through the valve 844. This results in the appearance of a positive going surge on the intensity buffer line 900 which, as will be seen later from further consideration of Figure 12, removes the blanking bias normally present on the control element 64 of the cathode ray tube 56, permitting the projection of an electron beam against the target area. The time constants of the circuits associated with the "read" flip-flop 840 are such that the distribution of current flow remains as described above until the arrival of the clock pulse at the "clear" junction 924 on the line 738.

The actions now observed are similar to those occurring during the set up of the "read" flip-flop. The clear valve 921 is normally non-conductive by virtue of the signal produced bias on its control grid 926. Thus, the diode 917 normally has potentials applied to it which are poled in its reverse direction. With the arrival of a positive impulse on the control grid 926, a surge of anode current passes through the valve 921, diminishing its anode potential sufficiently to initiate conduction through the diode 917 to develop a negative going impulse coupled to the anode 878 through the capacitor 914. This negative going impulse is in turn impressed on the control grid 876 through the capacitor 880 to decrease the flow of current through this valve, which it will be remembered, is now conductive as a result of the previous set-up operation. The resultant decrease in anode current produces a positive going impulse cross-coupled to the control grid 884 of the valve 844 which accelerates the process so far described to continue cumulatively until conduction is retransferred to the valve 844 and the normally non-conductive valve 842 has once again assumed the non-conductive state. At this time a negative going surge is transmitted along the intensity buffer line 900 which, after transmission through intermediate circuits, arrives at the beam control electrode 64 of the cathode ray tube 56, with a negative polarity to interrupt the flow of beam current from the electron gun assembly, ending the "reading" period.

If it should be desired to suppress the projection of the electron beam during the "select" portion of the function cycle, which as noted above, results in the bombardment of a given storage area several hundred times as frequently as any one of the balance of the storage areas, the switches 76 and 113 are closed. While the "select" driver valve is conductive, which is to say that the line 290 has received a negative going impulse, the valve 291 is non-conductive so that no current flows through the compensated load impedance 293, and the anode 295 is in the region of ground potential, that is positive with respect to the source lead 71. Under these conditions, when the grid 850 of the set-up valve 852 is driven positive, to develop a negative going impulse at the anode 860, the potential at the junction of the diodes 866 and 868 cannot fall lower than the level permitted by the intervening clamping action of the diode 911. Thus, the passage of signal to the set up side of the "read" flip-flop 840 is suppressed, preventing the electron beam from ever being turned on in the "read" portion of the cycle. Both switches 76 and 113 must be closed for this action. If the switch 113 remains open while the switch 76 is closed another inhibitory gate is actuated alone, which has no immediate relation to this part of the circuit. Hence, this action will be later discussed.

The action of writing into the memory is under the control of the "write" flip-flop 910 appearing in the upper right hand corner of Figure 13. This flip-flop includes the normally conductive valve 912 and normally non-conductive valve 914, having respective anodes 916 and 918 cross-coupled to respective control grids 920 and 922 through capacitors 925 and 927. Their cathodes are connected with the minus 100 volt supply line 101, while their space charge grids may be connected with the minus 70 volt supply line 71. The anode 916 of the valve 912 is supplied with anode excitation through the compensated load impedance 929, while the anode 918 of the valve 914 is similarly excited through the compensated load impedance 931. The positive ends of these two load impedances are joined and connected with ground through the dropping resistor 933 shunted by the capacitor 935. The control grid 922 of the normally conductive valve 912 may be connected with ground through resistor 936 while the control grid 920 of the normally non-conductive valve 914 may be returned to the minus 130 volt supply line 131 through the resistor 938. A pair of diodes 940 and 942 may be connected with the anode 918, the remote end of the diode 942 being returned through resistor 944 to the minus 100 volt supply line 101. In addition, the junction of the diode 942 and resistor 944 is connected in common between two further diodes 946 and 948. The polarity of all diodes is as indicated, the arrow indicating the direction of maximum conductivity. The other side of diode 948 is returned through the resistor 913 to the minus 70 volt supply line 71, while the diode 946 links the three-way diode junction with the signal output line 736.

The diode 940, already recited as connected with the anode 918, links this circuit point to the minus 100 volt supply line 101 through resistor 950, to the anode 952 of the "write" set-up valve 954 through diode 956 and to the anode 319 of the valve 315 through the diode 958. The control grid 960 of the set-up valve 954 may be linked with the tap 962 on the delay line 738 through capacitor 931, the grid return including resistor 964 connected at the end remote from the grid with fixed contact 966 of the "write" switch 93. In addition, the fixed contact 966 is linked with the minus 130 volt supply line 131 through a resistor 968. The movable contact of the "write" switch 93 is movable between fixed contact 966 and a further fixed contact 970 connected with ground through a resistor 972, the movable contact itself also being connected to ground through a capacitor 974. The "write" clear valve 976 has a control grid 978 connected with the tap 980 on the delay line 738 through a capacitor 982 and returned to the supply line 71 through resistor 984. The valve 976 is of the space charge grid type having the customary anode and space charge grid connections, and including an anode 986 connected with ground through a compensated load impedance 988 and with the anode 916 of the normally conductive side of the "write" flip-flop 912 through diode 990. An intensity buffer line 992 is connected to the anode 916 and leads to the control grid 994 of the intensity buffer valve 904 through inductance 996 shunted by resistance 998. The intensity buffer valve 904 is of the twin-triode type having a pair of cathodes 951, 953 returned to the minus 10 volt supply line 11, control grids 902 and 994 connected in the manner already described, and anodes 955 and 957 connected together and to plus 250 volts through the load impedance 959. In addition, the anodes 955 and 957 are coupled to the control grid 961 of the intensity driver 622 through capacitor 963. Positive going excitation of either line 900 or 992 develops an unblanking pulse at the anode of the intensity driver valve 622.

The impulses delivered along the line 714 to the sampling gate including diodes 702 and 712 are developed from stimuli derived from tap 962 of the delay line 738 and delivered through capacitor 453 to the control grid 455 of the valve 463. The valve 463 has its control grid 455 returned to ground through a resistor 465, a cathode 467 also connected with ground and an anode 469 connected with a source of anode potential through a compensated load 471. The grid 455 is biased by the signal produced grid current and the relatively narrow anode impulses produce correspondingly shaped anode voltage excursions coupled through the capacitor 473 and diode 475 to the control grid 477 of the sampling pulse output valve 491. The junction between the diode 475 and capacitor 473 is returned through a resistor 481 to the potentiometer 483 connected to ground at one end and to plus 100 volts at the other, while the grid end of the diode 475 may be connected through a compensated impedance 485 with ground. A similar compensated impedance 487 may be connected with the anode 489 of the sampling pulse output valve 491 through the capacitor 493, the anode 489 receiving its direct current excitation through a compensated load impedance 495.

Adjustment of the position of the tap on potentiometer 483 regulates the bias potential applied to the diode 475, and thereby permitting adjustment of the anode voltage excursion at 469 required to deliver a signal to the control grid 477. Since the clock impulse has sloping sides, this affords a means of controlling the sampling pulse width. The pulses so developed are delivered along the line 714 with a positive polarity to the sampling gate consisting of diodes 702 and 712 where it performs the functions earlier described.

The writing operation, like the reading operation, involves the projection of an electron beam from the electron gun in the cathode ray tube 56. In general, the writing is controlled in two manners; when inserting new material it is controlled by the "write" switch 93, while when regenerating previously stored material it is responsive to the signals originally impressed on the signal plate 20 and delivered after proper sampling and shaping to the signal output line 736.

The regenerative action will first be discussed. By reference to Figure 13 it is apparent that, so long as the movable contact 93 is not moved from fixed contact 970 to fixed contact 966, the "write" set-up valve 954 remains non-conductive, so that no pulses from the delay line tap 962 can be delivered to the anode 918 of the normally non-conductive valve 914. Because of the potentials resulting from the non-conductivity of the valve 954, a conductive path exists from ground through impedance 1000, diode 956 and resistor 950 to the supply line 101. Hence, because of the relatively low D.C. resistance of the impedance 1000, even though conduction should occur through the valve 315 the potential applied to the junction of the diodes 956, 958 and 940 cannot shift sufficiently negative to initiate the transfer of conduction between the two sides of the "write" flip-flop 910.

Tracing the action during the "regenerate" cycle, assume that in response to the action of the "read" flip-flop 840 an unfocused beam has bombarded a spot previously bombarded by an unfocused electron beam. There appears on the line 736 either no impulse or a very low amplitude positive impulse both of which are ineffective to transfer conduction between the two sides of the "write" flip-flop 910. As a result, the charge pattern of relatively large area established on the memory screen of the cathode ray tube 56 by virtue of bombardment with an unfocused beam, is allowed to remain undisturbed, since, when the "read" flip-flop is cleared, the potential on the intensity buffer line 992 is such as to leave a blanking bias impressed on the beam control element 64 of the electron gun assembly. The diode 948 is without effect, whatever the position of the switches 76 and 113, because of the conductivity of the valve 291.

Assume now, however, that the defocused beam bombards a spot previously occupied by a focused beam, resulting in an enlargement of the positively charged area on the storage screen of the cathode ray tube 56. The positively poled impulse observed at Figure 2*a* now appears, the portion included between the dashed lines intersecting the time axis being gated through diodes 702, 712 and 716, of Figure 12, onto the control grid 720 of the signal output valve 722, to arrive on the signal output line 736 with a negative polarity. This negative going impulse, diode 948 again playing no part, is applied to the anode 918 of the valve 914 and transfers conduction from one side to the other of the "write" flip-flop valve 910 in a manner which has already become familiar by repeated explanation, resulting in the development of a positive going impulse on the line 992 which is impressed on the intensity buffer 904 and intensity driver valve 622 to arrive at the beam control electrode 64 with the polarity required for the unblanking of the electron beam.

Now, when the "read" flip-flop 840 is cleared, the projection of the electron beam from the gun assembly continues by virtue of the excitation continuing to exist on the line 992, since the clearing of the "write" flip-flop 910 occurs at a much later time, when the clock pulse is at the end of the transmission line 738. Shortly after clearing of the "read" flip-flop 840, in response to the arrival of the clock pulse at the tap 924 on the delay line 738, the clock pulse arrives at the tap 820 on the delay 738 to clear the "focus" flip-flop 765. The conditions which result in the projection of an electron beam of a relatively large cross-section at the storage screen are now removed, but the beam bombardment continues, since the "write" flip-flop 910 remains set up. The former charge pattern of relatively small area is now re-established under the bombardment by the finely focused beam. This action has been illustrated earlier in connection with Figure 3. After the bombardment has continued for a time sufficient to effect the desired charge redistribution on the storage screen, this time being known empirically and matched by the spacing of the taps 820 and 980 on the delay line 738, the "write" flip-flop is cleared and the conditions existing at the beginning of the regeneration cycle are again present on the storage area which has just been regenerated.

The storage system which is being described is essentially binary in its internal notation; that is, it may store the representation of a "0" in the form of a relatively large positively charged area or a "1" in the form of a relatively small positively charged area. If it is desired to insert a "0" in a particular storage area, the switches comprising the switch bank 69 are set to provide bombardment of the selected area during the select portion of the function cycle. In addition, the switch 76 is closed. It will be recollected that the "select" bus 290 carries a negative going signal during the "select" portion of the function cycle. This signal cuts off the valve 291 so that its anode 295 remains in the region of ground potential. With the switch 76 closed, as has been assumed, this establishes a branch conductive path from the junction of diode 946 and resistor 944 through diode 948 which serves to prevent the diode end of resistor 944 from swinging negatively when a negative impulse appears on the line 736. Thus, when the switch 76 is closed, set up of the "write" flip-flop 910 is effectively inhibited. As a consequence, there will be no reinserting or "writing" period of bombardment of the selected storage area subsequent to its bombardment by the defocused reading beam, and there will remain on the storage screen a relatively large positively charged area corresponding to a "0" in the selected region. Therefore, closing the switch 76 with the switch 113 open will insert a "0" in the selected memory area.

If it is desired to insert a "1" in a given storage area, the switches 76 and 113 are opened. After the switch bank 69 has been set to select the desired storage area, the "write" switch 93, whose movable contact has been previously in engagement with fixed contact 970, is actuated to connect the capacitor 974 between fixed contact 966 and ground. This momentarily removes the cut-off bias on the control grid 960 of the "write" set-up valve 954 for a period of time determined by the time constant of cooperating resistance and capacitor elements. The time constant of the resistors 964 and 968 and capacitor 974 may be of the order of 10 microseconds or more, the exact time being non-critical so long as it is longer than the time between successive "select" portions of the function cycle. Upon the arrival of the next succeeding clock impulse at the tap 962 on the delay line 738, an anode current impulse is passed by the valve 954 to swing its anode 952 negatively with respect to ground. The negative excursion of the anode 952 diminishes the flow of current through the diode 956 so that the diode end of the resistor 950 is free to swing negatively if one other condition is satisfied. This condition is that conduction cease simultaneously through the diode 958. It will be recollected that, during the "select" portion of the function cycle, the regenerate bus 314 is, relatively speaking, at the positive end of its excursion, so that the valve 315 conducts swinging its anode 319 negatively with respect to ground. Hence, during the "select" portion of the function cycle the flow of current through the diode 958 is simultaneously interrupted, or decreased, so that the diode end of the resistor 950 becomes more negative with respect to ground and initiates conduction through diode 940 to effect a transfer of conduction between the two sides of the "write" flip-flop 910 creating the conditions requisite for the projection of a finely focused beam on the selected storage area during the latter part of the "select" portion of the function cycle leaving the selected area with a binary "1," as was desired. Thereafter the "1" is retained in this memory position by the systematic operation of the regeneration process which has not in any way been interfered with by the conditioning of the circuits heretofore mentioned.

Mention has already been made of the fact that the selected storage area is subjected to electron beam bombardment for a much greater fraction of time than are the balance of the storage areas, which are merely subjected to periodic regeneration one at a time. This arises from the fact that the same selected storage area is bombarded between each regeneration cycle, while 1023 other regenerated storage areas are successively bombarded before the return of the bombarding beam to an arbitrarily selected one of any of said regenerated storage areas. Thus, the selected storage area will appear as a bright spot on the storage screen and prolonged bombardment of this area with such a high duty cycle may ultimately result in damage thereto.

Accordingly, provision is included, in the form of the spot switch 113, for suppression of the "select" bombardment of the chosen area. When the switches 76 and 113 are simultaneously closed, set up of the read flip-flop 840 and write flip-flop 910 is effectively inhibited so that a blanking potential remains on the beam control electrode 64 at all times during the "select" portion of the function cycle. Operation during the "regenerate" portion of the function cycle is unchanged. With the switches 76 and 113 closed, and a negative going impulse on the "select" line 290 (the "select" portion of the function cycle) the valve 291 is non-conductive, leaving its anode 295 at very nearly ground potential due to the relatively low impedance of the load 293 and the relatively high impedance of the circuits which are about to be described.

When the clock impulse arrives at the control grid 850 of the "read" set up valve 852, an anode current surge is passed by the tube which momentarily swings the anode 860 of the valve 852 negative with respect to ground. When the switch 113 is open, this negative anode excursion decreases or cuts off the flow of current through the diode 866, so that the diode end of the resistor 872 may assume a potential as negative as minus 70 volts, the potential of the supply line 71. With the switch 113 closed, however, as has been assumed, any negative excursion of the diode end of the resistor 872 due to the flow of anode current impulses through the tube 852 is inhibited, since a negative shift of potential of the diode end of the resistor 872 creates a voltage difference of such polarity as to produce conduction in the forward direction through diode 911, preventing any substantial negative excursion of the diode end of the resistor 872 when the diode 911 is fed from a low impedance source, as is the case in the present instance.

By so preventing the "read" flip-flop 840 from setting up, it is insured that there will be no projection of the electron beam as is required to develop a signal from the storage area under observation during the "select" portion of the function cycle. Thus, no signals are developed on the signal output line 736 and, hence, the "write" flip-flop 910 cannot be set up, whereby beam bombardment during the latter portion of the cycle is also effectively prevented. Should, perchance, a negative going signal appear on the signal output line 736, further set up of the "write" flip-flop 910 is prevented by the inhibiting diode 948 which functions in the same manner as diode 911 to prevent the delivery of a set up signal to its associated flip-flop 910.

Output signals, in the form of one negative going impulse for each "1," are delivered on the output line 943 which is fed, through the diode 945, from the anode 918 of the "write" flip-flop 910. An inhibiting diode 949 is connected between the movable contact of the output selector switch 937 and the diode end of a resistor 947 returned to the supply line 71. The output selector switch 937 is also provided with the fixed contact 939 connected with the anode 319 of the valve 315 and with the free fixed contact 941. The diode 945 is normally conductive, current flow occurring through the path; resistor 933, load 931 and diode 945 through the resistor 947 to the line 71. When the "write" flip-flop 910 is set up, the anode 918 suffers a negative excursion, cutting off the flow of current through the diode 945 and permitting the diode end of resistor 947 to assume the potential of the supply line 71. The signal thus developed may be delivered on the output line 943 to any desired load device or associated apparatus. A continuous train of such impulses, from selected and regenerated storage areas alike, is bent out over the line 943, when the movable contact engages contact 941. If the movable contact 937 is connected with the fixed contact 939, only the impulses occurring during the "select" portion of the function cycle are delivered to the output line 943. During the "select" portion of the function cycle, the valve 315 is conductive so that its anode 319 is relatively negative with respect to ground to an extent effectively removing the diode 949 from participation in the operation of the circuit since the polarity to which it is subjected always has a sense tending to force conduction in the reverse or high impedance direction. Thus, all impulses originating at the anode 918 of the "write" flip-flop 910 during "select" are transmitted to the output signal line 943. During the "regenerate" portion of the function cycle, the valve 315 is cut off by virtue of the negative going impulse applied to its control grid so that the anode 319 remains at substantially ground potential. Now, when the anode 918 becomes negative with respect to ground, diminishing the flow of current through the diode 945 or cutting off same, current flow is maintained through the branch line including diode 949 to effectively suppress all signals originating during regeneration and prevent them from arriving with any substantial amplitude at the output signal line 943.

During the test and adjustment of apparatus such as described in the instant specification, it is often helpful to be able to observe signals such as are developed when an entire storage pattern of blurs is replaced by dots and vice versa. To meet this requirement, the signal switch 82 may be opened, and the anode 732 of the signal output amplifier 722 connected with suitable oscillographic apparatus. The single-pole, double-throw switch 88 is so positioned that the fixed contact 814 is connected with the resistor 812 so that the focus driver valve 792 is removed from the circuit and the beam enlarger control valve 386, which is driven from stage "11" of the cascaded counters 77, governs the potential applied to the focus control line 632. During alternate actuations of the stage "11," the valve 386 is conductive and non-conductive so that there are alternately delivered to the focus control electrode 66 of the cathode ray tube 56 a focus voltage and a defocus voltage, the period of application of each lasting for a full frame scan. During the first scan, therefore, which may be one in which the valve 386 is conductive, the beam is projected on the storage areas is focused condition, so that a series of dot patterns are laid down. During the next frame scan, while the valve 386 is non-conductive, a defocus voltage is applied to the focus control electrode 66 and a grid of relatively large charged areas are laid down within the elemental storage regions on the dots previously deposited there, to develop the characteristic substitution signal (Figure 2*a*) which may be observed on the aforementioned oscillographic apparatus. Thereafter, the valve 386 again becomes conductive, removing the defocus potential, to substitute for the relatively large charged areas a series of dots producing this class of substitution signal (Figure 3*a*) which may be again observed for purposes of test and/or adjustment.

Figure 14 illustrates some of the charge distributions within the storage area which have been investigated. In Figure 14*a* there is illustrated the characteristics of the dot-blur storage system whose details have so far been outlined. A dot characteristic of the relatively small positively charged area produced by bombardment with a finely focused beam, is illustrated at 951. The larger, more diffused, charged area characteristic of bombardment by a defocused beam is illustrated at 953, while the superposition of the two is illustrated at 955. The wave form at 957 illustrates the general form of output voltage observed at the signal electrode during the transition. It will be noticed that this output surge is characterized by an initial negative portion resulting from the creation of a space charge immediately adjacent the storage area and is followed by a relatively broad positive surge arising from the net loss of electrons from the screen when the larger charged area is substituted for the smaller.

Experiments have also been conducted with the so-called dot-wiggle system in which the electron beam remains focused but is caused to oscillate about its central position in the storage area at a frequency high enough to be beyond the pass band of the signal amplifier. As shown in Figure 14B, the charge pattern produced by bombardment with a stationary finely focused beam is illustrated at 959 while the large charge pattern characteristic of bombardment by the oscillating beam appears at 961. A super position of the two illustrating the change in charge area appears at 963, while there is shown at 965 a representation of the output signal wave form observed when the larger charged area is substituted for the smaller, as would be the case when an oscillatory beam impinged on an area previously bombarded by a stationary beam. This wave form is again characterized by an initial negative excursion followed by a rather peaked positive surge exponentially approaching the zero axis. The peaked nature of the positive surge observed in this instance makes proper adjustment of the timing and sampling gate circuits somewhat more critical than does the previous arrangement and hence, though useful, the system of Figure 14B is not quite as advantageous as some of the other basic patterns. While the patterns produced by plane horizontal deflection of the beam are illustrated in Figure 14B, it will be understood that planar vertical deflection could be employed, or in fact planar deflection in any direction, without substantial modification of the illustrated output impulse.

The utilization of the storage patterns of Figure 14C, which are relatively simply produced, has been found to afford substantial advantage over the foregoing charge area configurations. In Figure 14C, a "1" is represented by a dot, shown at 967 and a "0" by an annulus, shown at 969, in which the inner diameter of the annulus may be greater than the dot diameter by approximately the dot diameter. The two configurations are superposed at 971 and the output impulse resulting from superposition of the larger charged area on the smaller is illustrated at 973. Here, again we note the initial negative excursion due to the development of a space charge adjacent the bombarded storage area, followed in this case by a rather broad positive plateau decaying in the usual fashion over a time period of the order of 2 microseconds. A system for the generation and utilization of dot-circle storage will be discussed in connection with Figure 16 below.

We may, however, pass for the moment to the general system at Figure 14D in which the dot 975 may be replaced by any generalized pattern of large area 977 with the superposed charge patterns illustrated at 979. Note at 981 that the signal developed at the signal electrode associated with the cathode ray tube screen is of substantially the same form as that observed when the dot-circle system is used, possessing the small initial negative surge followed by a broad positive plateau decaying to substantially zero over a time period of the order of 2 microseconds. It is clear from a consideration of the foregoing, that the essence of such storage system resides in the replacement of one charged area of given size by another of relatively larger size with utilization of the charge currents produced in carrying out this change for the development of signals used in controlling the operation of the auxiliary apparatus completing the memory or storage system.

The system whose detail has so far been described, relies on the alternative use of a focused or defocused beam of electrons to develop the charged regions of different areas. In general, the registry of the two types of pattern is that illustrated at 955 in Figure 14A. However, variations in the structure of the cathode ray tubes arising in the course of manufacture, particularly with certain designs, may place the dot asymmetrically within the charged area produced by the defocused beam, as illustrated at 983 in Figure 15. Such asymmetry affects the manner and rate of net charge redistribution in a fashion greatly reducing the maximum ratio of positive to negative signal observed in the course of the substitution cycle. For example, as shown in Figure 15B when the focused spot is asymmetrically disposed within the area bombarded by the defocused beam, subsequent bombardment by the defocused beam after the insertion of a dot pattern may produce the dashed line voltage-time characteristic 985, while the wave form of the negative surge 987 remains substantially unchanged, as would be expected since an unfocused beam bombards a spot previously occupied by an unfocused beam and there is no registry problem. The advantage of the dot-circle system, illustrated at Figure 14C is apparent from the consideration of Figure 15B, for the curve 989 illustrates the positive charging surge observed in this case. The curve 989, coupled with the curve 987 quite definitely delivers a greater ratio of positive to negative impulses over a considerable region, with resulting enhancement of the reliability of the storage system. In the dot-circle system, the electron beam remains finely focused at all times, but when it is desired to read the information previously in the storage area or to insert a "0," deflecting stimuli are applied causing the beam to rapidly execute a circular motion whose period may preferably be beyond the upper response frequency of the associated signal amplifier.

The following Figure 16 illustrates a method of developing dot-circle patterns with a sufficient showing of the balance of the storage system circuits to relate it thereto.

The deflection drivers 472 and 582 drive the horizontal deflecting and vertical deflecting plates 60, 61 of the cathode ray tube 56, respectively. The voltages required for driving the electron beam through the desired circular path are derived from an oscillator 401 of the conventional type. This oscillation generating circuit may operate at a frequency of 15 mc. per second. A lead 403 is brought out from the oscillator circuit and connected to the control grids 405 and 407 of a pair of gate valves 409 and 411 which may be of the type commercially designated 6AS6. Each of the gate valves is provided with a space charge grid returned to a positive supply line and, in addition, the valve 409 includes a suppressor grid 413, corresponding to a similar suppressor grid 415 in the valve 411, both of which may be connected through capacitor 630 with the anode 806 of the focus driver valve 792. In this instance, it will be noted that the valve 792 provides control of the effective beam cross-sectional area, and not the focus, since the focus electrode 66 of the cathode ray tube 56 is connected directly to the tap on the focus control potentiometer 602 and shunted to ground through the filter capacitor 603.

The valve 409 includes, as well, a cathode 417 connected with ground through the bias resistor 421 bypassed by the capacitor 419, while the anode 423 of the valve 409 is connected with an anode supply source through the inductor 425 shunted by the resistor 427 and the adjustable capacitor 429. In addition, the anode 423 is coupled with one of the horizontal deflecting plates through a capacitor 431.

The valve 411 includes a cathode 433 returned to ground through the resistor 435 shunted by capacitor 437, and an anode 439 connected with an anode supply source of plus 100 volts through the inductor 441 shunted by resistor 443 and adjustable capacitor 445. Signals appearing at the anode 439 are coupled to one of the vertical deflecting plates 61 through coupling capacitor 451. The resistors 427, 443 and capacitors 429, 445 connected in the anode circuit of the respective gating valves are so adjusted as to provide at the anodes, voltages of substantially equal amplitude but quadrature phase, so that their simultaneous application to the two sets of deflecting electrodes produces on the screen of the cathode ray tube a circle of size somewhat smaller than the selected storage area, providing that both of the gating valves are conditioned to pass signals.

This oscillator and gating valve combination is interposed between the beam enlarger valve 792 and the cathode ray tube in the fashion illustrated, whereby, when the valve 792 conducts, the bias normally present on the suppressor electrodes 413 and 415 prevents the flow of anode current through the associated load circuits. If conduction through the valve 792 be now cut off, a positive impulse is developed across the compensated load 808 which is applied to the control electrodes 413 and 415, to initiate conduction through the valves 409 and 411 and deliver to the deflecting electrodes of the cathode ray tube 56 voltages of the proper magnitude and phase to develop on the screen a circle whose outer diameter is of the order of three times the outer diameter of the dot which it may replace. The resonant combinations in the anode circuits of the gating valves are sufficiently dampened by reason of the shunting resistors also situated therein, that oscillations build up to their stable amplitude and/or die away with the removal of excitation in a sufficiently short period of time to avoid interference with the operation of the system as described.

The timing diagram of Figure 17 will serve to clarify the system operation. Each time a clock pulse arrives at the tap 742, the beam size control flip-flop 765 is actuated to deliver to the cathode ray tube 56 the necessary sweep generating voltages illustrated at Figure 17A. Sometime later the clock pulse arrives at the tap 846 to set up the "read" flip-flop 840, developing an unblanking signal (Figure 17B) which is applied to the grid 64 of the cathode ray tube 56. The nature of the signal present on the face of the cathode ray tube is tabulated at Figure 17C and results in the output wave illustrated at Figure 17D. The sampling impulses shown in Figure 17E are derived from the tap 962 on the delay line 738 and serve to set up the "write" flip-flop 910 if they occur during a positive signal as illustrated along line 17D. This will be the case where the information previously present in the storage area with a dot ("1"), and it is desired to replace the dot which has been dissipated by the diffuse reading beam. These signals set up the dot or "write" flip-flop 910 as shown in Figure 17F. The flip-flop 910 is periodically stimulated with reset pulses shown at Figure 17G, these impulses leaving the flip-flop 910 unaffected if it has not been previously set up. The resultant voltage delivered to the control element 64 of the cathode ray tube 56 is illustrated in Figure 17H, where the prolongation of the "on" period of the electron beam within the cathode ray tube into the time period when the circle generator has been rendered inoperative, is rendered clearly visible. The resultant dot bombardment at the end of the function cycle reinserts the originally stored information in the memory position involved, as outlined above.

While only a few representative embodiments of methods of practicing the inventions disclosed herein have been outlined in detail, there will be obvious to those skilled in the art, many modifications and variations accomplishing the foregoing objects and realizing many or all of the advantages, but which yet do not depart essentially from the spirit of the invention.

What is claimed is:

1. In storage apparatus; an electrode assembly projecting a beam of charged particles, a beam target adapted to intercept said beam, a signal electrode associated with said target, beam positioning apparatus controlling the point of beam impingement on said target, a first beam character control, a second beam cross-sectional area control, a signal input line operatively connected with said beam positioning apparatus and said first beam character control, means connecting said signal electrode with said second beam cross-sectional area control, said second cross-sectional area control being responsive to signals appearing on said beam target to control the cross-sectional area of said beam, and a signal output line adapted to receive signals controlled by electric stimuli appearing on said signal electrode.

2. In storage apparatus; an electrode assembly adapted to project a beam of charged particles, a beam target adapted to intercept said beam, beam positioning apparatus periodically deflecting said beam through a predetermined pattern of points on said target and time interlacing therewith an arbitrarily selected pattern, a first beam character control active to cause said beam to have a predetermined characteristic during the execution of said predetermined pattern for varying the characteristic of said beam from said predetermined characteristic, and a second beam character control active during the execution of said arbitrary pattern.

3. In storage apparatus; a beam projecting device adapted to project a beam of charged particles, a beam target intercepting said beam, beam positioning apparatus periodically deflecting said beam through a predetermined pattern of points on said target and time interlacing therewith an arbitrarily selected pattern, said beam alternately exciting elements of said predetermined pattern and elements of said arbitrary pattern, a first beam character control active during the execution of said predetermined pattern to cause said beam to have a predetermined characteristic, and a second beam character control active during the execution of said arbitrary pattern for varying the characteristic of said beam from said predetermined characteristic.

4. In storage apparatus; a target member, a beam projecting device adapted to project a beam of charged particles against said target, a signal lead associated with said target, a first beam control periodically creating the conditions for a beam of different effective cross-sectional areas at said target, a second beam control periodically turning said beam on and off, and means operatively connected with said signal lead responsive to signals appearing thereat for varying the length of the on period of said beam and to control the cross-sectional area of said beam.

5. In storage apparatus; a target member, a beam projecting device adapted to project a beam of charged particles against said target, a signal lead associated with said target, a first beam control periodically creating the conditions for a beam of relatively large cross-sectional area at said target, a second beam control establishing said beam after the conditions for a beam of relatively large cross-section have been created, and a control circuit receiving signals from said signal lead prolonging the on period of said beam in response to impulses of predetermined nature on said signal lead and not affecting said on period substantially in the presence of signals of other natures on said signal lead to control the cross-sectional area of said beam.

6. In storage apparatus; a target member, a beam projecting device adapted to project a beam of charged particles against said target, a signal lead associated with said target, a first beam control periodically creating the conditions for a beam of relatively large cross-sectional area at said target, a second beam control establishing said beam after the conditions for a beam of relatively large cross-section have been created and normally interrupting said beam before the termination of said conditions, and a control circuit receiving signals from said signal lead prolonging the on period of said beam beyond the termination of said conditions in response to impulses of predetermined nature on said signal lead and not substantially affecting said on period in the presence of signals of other natures on said signal lead to control the cross-sectional area of said beam.

7. In storage apparatus; a target member, a beam projecting device adapted to project a beam of charged particles against said target, a signal lead associated with said target, a first beam control periodically creating the conditions for a beam of relatively large cross-sectional area at said target, a second beam control establishing said beam after the conditions for a beam of relatively large cross-section have been created and normally interrupting said beam before the termination of said conditions, and a control circuit responsive to signals from said signal lead governing the existence of said beam during a time interval intermediate successive beam enlargements by said first beam control to control the cross-sectional area of said beam.

8. In combination, a target member, a beam projecting electrode assembly including a beam control electrode adapted to project a beam of charged particles against said target, a signal lead associated with said target, beam deflecting apparatus operatively associated with said electrode assembly and deflecting said beam over an area of said target with a predetermined periodicity, and control apparatus connected between said signal lead and said beam control electrode to maintain said beam in one condition.

9. In combination, a target member, a beam projecting electrode assembly including a beam control electrode adapted to project a beam of charged particles against said target, a signal lead associated with said target, periodically operative beam deflecting apparatus operatively associated with said electrode assembly repetitively deflecting said beam in a predetermined pattern over an area of said target with a predetermined periodicity, a first beam control circuit activating said beam control electrode during a plurality of traverses of said pattern to cause said beam to have a predetermined characteristic, and a second beam control circuit activating said beam control electrode after the termination of said repetitive deflection in response to impulses of predetermined character on said signal lead for varying the characteristic of said beam from said predetermined characteristic.

10. In combination, a target member, a beam projecting electrode assembly including a beam control electrode adapted to project a beam of charged particles against said target, a signal lead associated with said target, periodically operative beam deflecting apparatus operatively associated with said electrode assembly repetitively deflecting said beam in predetermined patterns traced with a predetermined periodicity over spaced elemental areas of said target, a first beam control circuit activating said beam control electrode during a plurality of traverses of said pattern to cause said beam to have a predetermined characteristic, and a second beam control circuit activating said beam control electrode after the termination of said repetitive deflection for varying the characteristic of said beam from said predetermined characteristic.

11. In storage apparatus, a charge receiving member, a beam projector for projecting a beam of a predetermined characteristic for producing a first charge pattern on said charge receiving member, means for varying the characteristic of said beam for producing a different charge pattern on said charge receiving member substantially in register with said first charge pattern, and means associated with said member responsive to the change in said charge patterns for controlling said charge pattern producing means.

12. In storage apparatus, a charge receiving member, means for producing a first charge pattern of relatively small area on said charge receiving member, means for producing a charge pattern of relatively larger area on said charge receiving member substantially in register with said first charge pattern, and means for reestablishing said first charge pattern in response to impulses resulting from the establishment of said second charge pattern.

13. In storage apparatus, a charge receiving member, means including a beam projecting means for projecting a beam having two different characteristics for optionally producing a charge pattern on said charge receiving member, means for obliterating said charge pattern, and means for reestablishing said charge pattern in response to impulses resulting from the obliteration of said charge pattern.

14. In storage apparatus, a charge receiving member, means for optionally producing a relatively small first circular charge pattern on said charge receiving member, means for producing a second relatively larger circular charge pattern on said charge receiving member substantially in register with said first charge pattern, and means for reestablishing said first charge pattern in response to impulses resulting from the establishment of said second charge pattern in place of said first charge pattern.

15. In storage apparatus, a charge receiving member, means for optionally producing a first circular charge pattern on said charge receiving member, means for producing a second annular charge pattern on said charge receiving member embracing the area of said first charge pattern, and means for reestablishing said first charge pattern in response to impulses resulting from the establishment of said second charge pattern in place of said first charge pattern.

16. In storage apparatus, a beam target, an electrode assembly including a beam control electrode adapted to project a beam of charged particles against said beam target, cross-section control apparatus varying the effective beam cross-section at said target, means periodically exciting said beam control electrode to establish said beam, a signal lead associated with said beam target, and a sampling gate connecting said signal lead and said cross-section control apparatus to control said effective beam cross section.

17. In storage apparatus, a beam target, a signal lead associated with said beam target, an electrode assembly including a beam control electrode adapted to project a beam of charged particles against said beam target, cross-section control apparatus varying the effective beam cross-section at said target, a source of electric potentials periodically exciting said beam control electrode to establish said beam, and a sampling gate opening not earlier than 0.1 microsecond after the establishment of said beam and closing not late than 0.9 microsecond after the establishment of said beam connecting said signal lead and said cross-section control apparatus to vary the cross-sectional characteristic of said beam.

18. An information storage device comprising a storage member, an electron beam producing means for charging areas of said storage member means for reading the said information stored on said area comprising said electron beam producing means, and means for varying a characteristic of said beam producing means to condition said beam for reading information stored on said member.

19. An information storage device comprising a storage member of insulating material, an electron beam producing means for charging areas of said storage member, beam deflection means for positioning said electron beam on an area of said storage member, and means for reading the said information stored on said area comprising said electron beam comprising means for varying a characteristic of said beam to condition said beam for reading information stored on said member.

References Cited in the file of this patent

UNITED STATES PATENTS

| | | |
|---|---|---|
| Re. 22,390 | Lewis | Nov. 9, 1943 |
| 2,034,704 | Nakashima et al. | Mar. 24, 1936 |
| 2,155,192 | Johnson | Apr. 18, 1939 |
| 2,221,115 | Shepard | Nov. 12, 1940 |
| 2,236,793 | Furber | Apr. 1, 1941 |
| 2,237,440 | Jones | Apr. 8, 1941 |
| 2,241,809 | DeForest | May 13, 1941 |
| 2,292,045 | Burnett | Aug. 4, 1942 |
| 2,302,786 | McGee et al. | Nov. 24, 1942 |
| 2,304,163 | Goldsmith | Dec. 8, 1942 |
| 2,398,642 | Homrighous | Apr. 16, 1946 |
| 2,402,989 | Dickinson | July 2, 1946 |
| 2,406,382 | Kellogg | Aug. 27, 1946 |
| 2,407,000 | Evans | Sept. 3, 1946 |
| 2,410,233 | Percival | Oct. 29, 1946 |
| 2,412,467 | Morton | Dec. 10, 1946 |
| 2,425,330 | Kenyon | Aug. 12, 1947 |
| 2,430,331 | Galella et al. | Nov. 4, 1947 |
| 2,434,196 | Cawein | Jan. 6, 1948 |
| 2,442,770 | Kenyon | June 8, 1948 |
| 2,444,338 | Dimond | June 29, 1948 |
| 2,444,700 | Hillier | July 6, 1948 |
| 2,448,762 | Beste | Sept. 7, 1948 |
| 2,449,524 | Witherby et al. | Sept. 14, 1948 |
| 2,454,410 | Snyder | Nov. 23, 1948 |
| 2,463,535 | Hecht | Mar. 8, 1949 |
| 2,465,368 | Frink | Mar. 29, 1949 |
| 2,466,924 | Bradford et al. | Apr. 12, 1949 |
| 2,473,691 | Meacham | June 21, 1949 |
| 2,492,700 | Jeanne | Dec. 27, 1949 |
| 2,508,408 | Liebson | May 23, 1950 |
| 2,532,719 | Homrighous | Dec. 5, 1950 |
| 2,548,789 | Hergenrother | Apr. 10, 1951 |
| 2,639,425 | Russell | May 19, 1953 |

OTHER REFERENCES

Haeff: "A Memory Tube," Electronics, September 1947, pages 80 to 83.

"A Storage System For Use with Binary-Digital Computing Machines," F. C. Williams and T. Kilburn, Proceedings of The Institute of Electrical Engineers, part III, March 1949, pages 81 to 100.

Radiation Laboratory Report 562, M.I.T., Cambridge, Mass.

UNITED STATES PATENT OFFICE
CERTIFICATE OF CORRECTION

Patent No. 2,969,478 January 24, 1961

John Presper Eckert, Jr., et al.

It is hereby certified that error appears in the above numbered patent requiring correction and that the said Letters Patent should read as corrected below.

Column 22, line 14, for "anad" read -- and --; line 68, for "46" read -- 446 --; column 38, line 21, for "bent" read -- sent --; line 67, for "is" read -- in --; column 44, line 65, for "late" read -- later --.

Signed and sealed this 24th day of October 1961.

(SEAL)

Attest:

ERNEST W. SWIDER
Attesting Officer

DAVID L. LADD
Commissioner of Patents

USCOMM-DC